United States Patent
Kodama et al.

(10) Patent No.: US 7,630,097 B2
(45) Date of Patent: Dec. 8, 2009

(54) IMAGE PROCESSING APPARATUS AND METHOD

(75) Inventors: Mari Kodama, Kanagawa (JP); Kazunori Kurokawa, Kanagawa (JP); Seiji Iino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 976 days.

(21) Appl. No.: 10/804,062

(22) Filed: Mar. 19, 2004

(65) Prior Publication Data

US 2004/0199864 A1 Oct. 7, 2004

(30) Foreign Application Priority Data

Mar. 20, 2003 (JP) .............................. 2003-077022

(51) Int. Cl.
*G06F 15/00* (2006.01)
(52) U.S. Cl. .................. 358/1.18; 358/1.15; 358/1.9; 358/1.12; 358/1.13; 358/445; 358/452; 358/453; 358/462
(58) Field of Classification Search ................ 358/1.15, 358/1.9, 1.12, 1.13, 1.18, 445, 452, 453, 358/462

See application file for complete search history.

(56) References Cited

U.S. PATENT DOCUMENTS 4,734,735 A * 3/1988 Haneda ....................... 399/231
5,619,623 A * 4/1997 Takayanagi et al. ........ 358/1.15
6,757,071 B1 * 6/2004 Goodman et al. .......... 358/1.13
2001/0028408 A1 10/2001 Arima
2002/0196464 A1 * 12/2002 Kodama et al. ............ 358/1.15
2003/0007173 A1 * 1/2003 Nishide et al. ............. 358/1.15
2003/0140008 A1 * 7/2003 Kawamoto .................... 705/40
2003/0160997 A1 * 8/2003 Kimura ..................... 358/1.15

FOREIGN PATENT DOCUMENTS

| JP | A-7-046418 | 2/1995 |
|---|---|---|
| JP | A-08-069518 | 3/1996 |
| JP | B2 2923002 | 4/1999 |
| JP | A-2001-186449 | 7/2001 |
| JP | A-2002-125133 | 4/2002 |
| JP | A 2003-5343 | 1/2003 |
| JP | A 2003-5931 | 1/2003 |
| JP | A 2003-8870 | 1/2003 |
| JP | A-2003-44242 | 2/2003 |

OTHER PUBLICATIONS

Japanese Office Action (w/translation), Reference # FE03-00208, Oct. 20, 2008.

* cited by examiner

*Primary Examiner*—Chan S Park
(74) *Attorney, Agent, or Firm*—Oliff & Berridge, PLC

(57) ABSTRACT

An image processing apparatus including, an image processing unit that performs a first image processing on image data including one or more image constituent parts, an incompatible part detection unit that executes an incompatibility detection processing, and an accounting unit that accounts for the executed incompatibility detection processing. Preferably, the incompatibility detection processing detects an incompatible part incompatible with the first image processing from the image constituent parts.

6 Claims, 30 Drawing Sheets

3, 4, 12, 16, 18

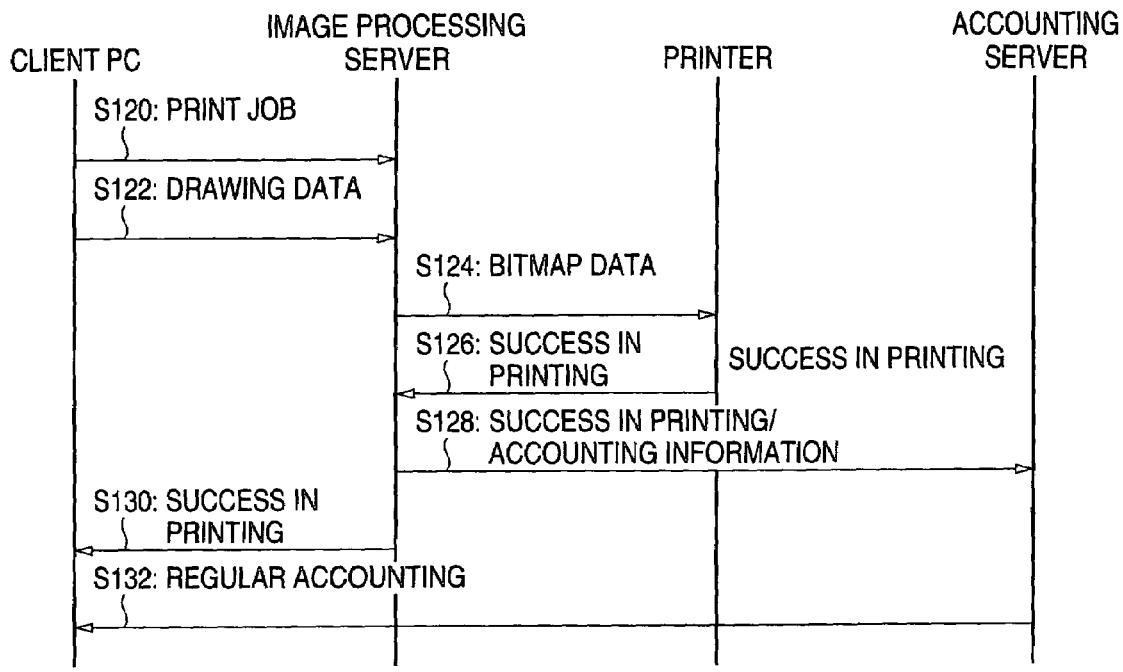
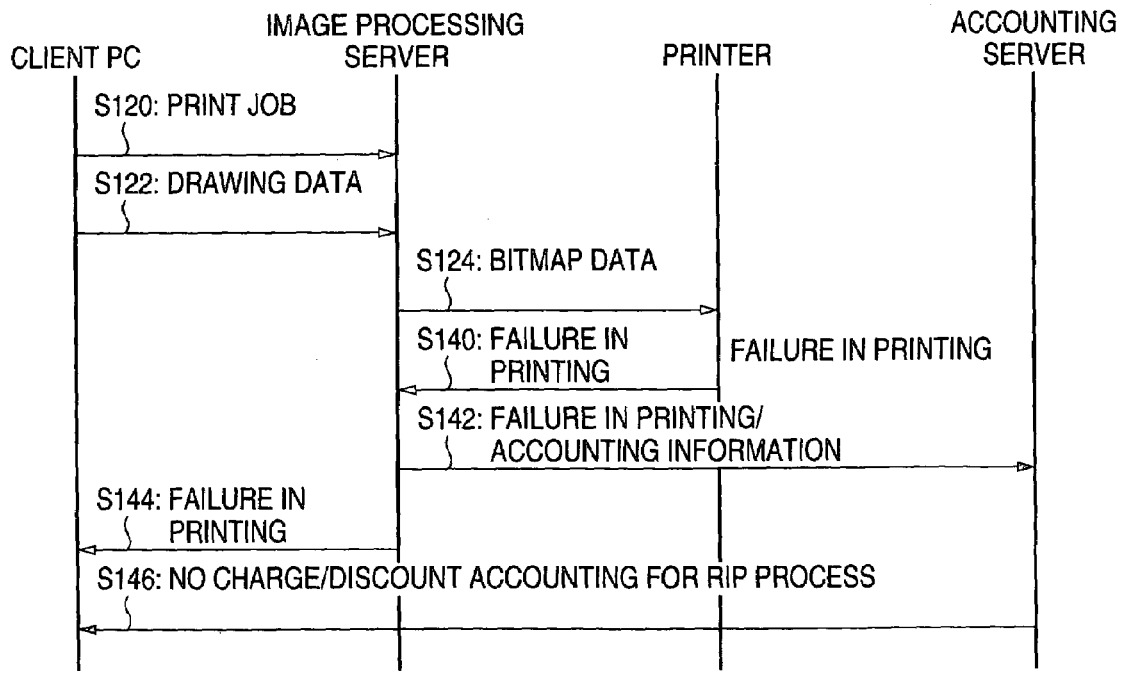

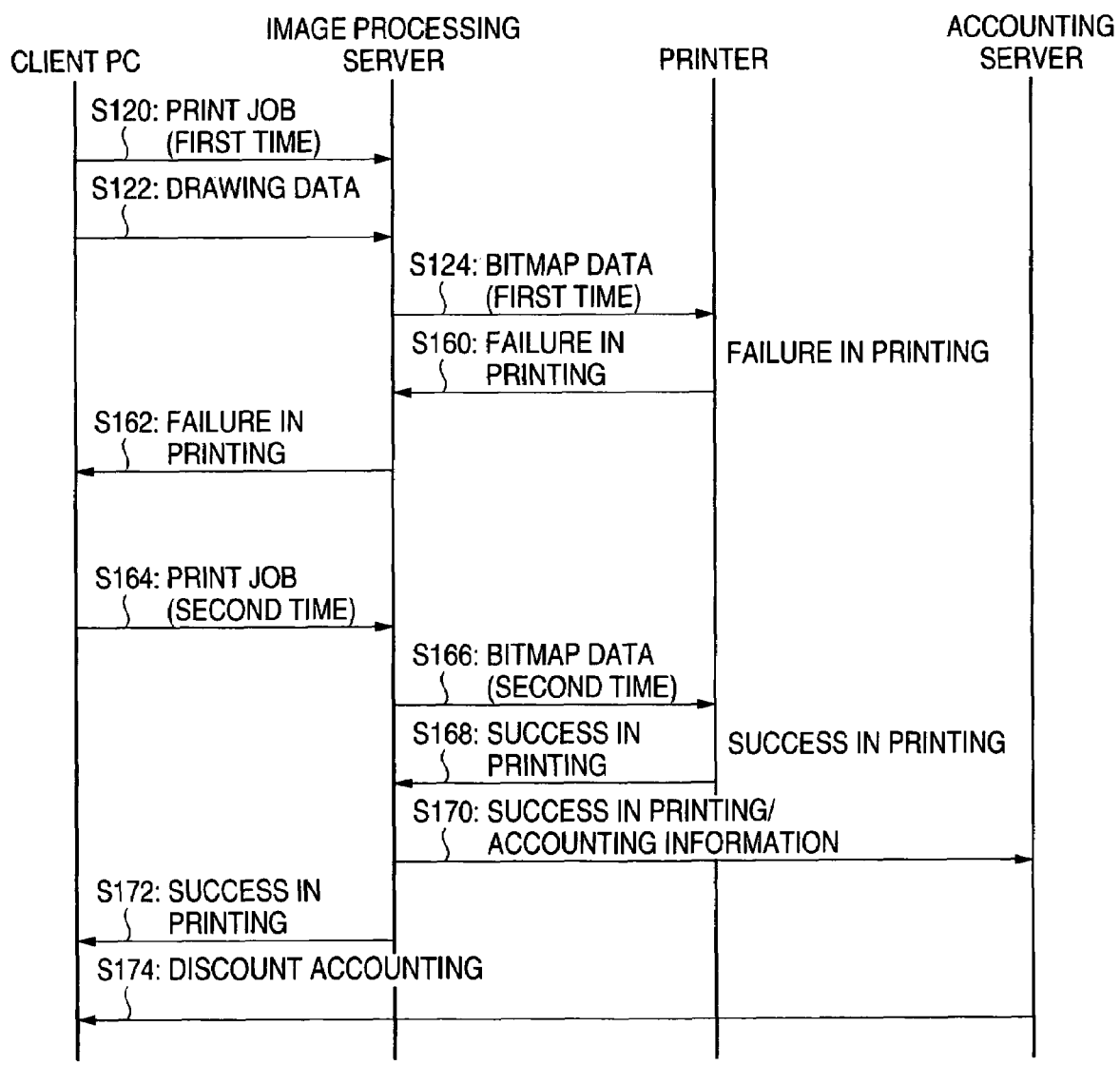

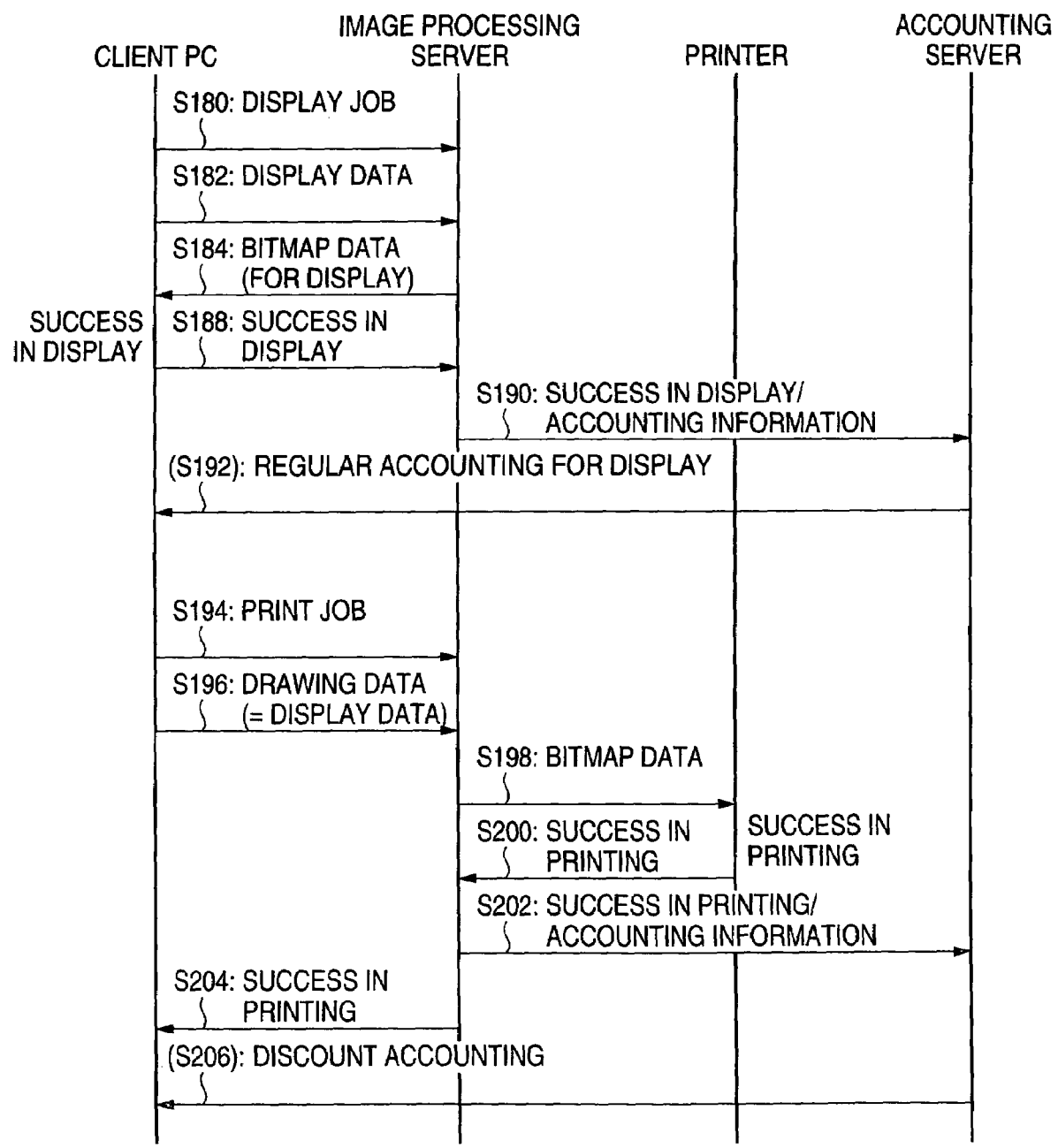

FIG. 19
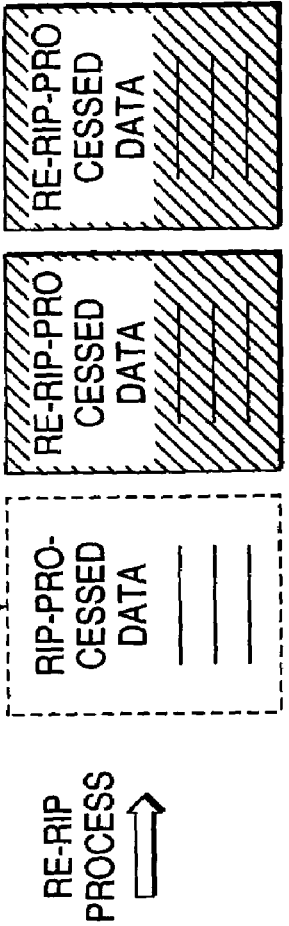
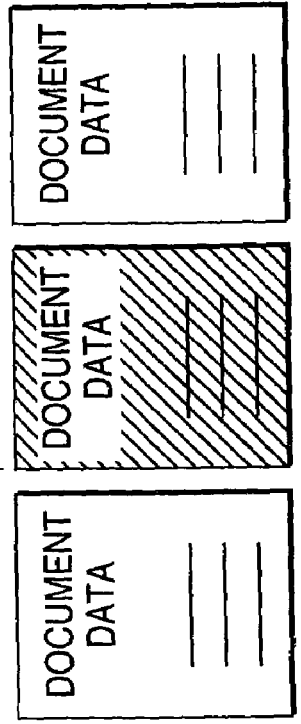

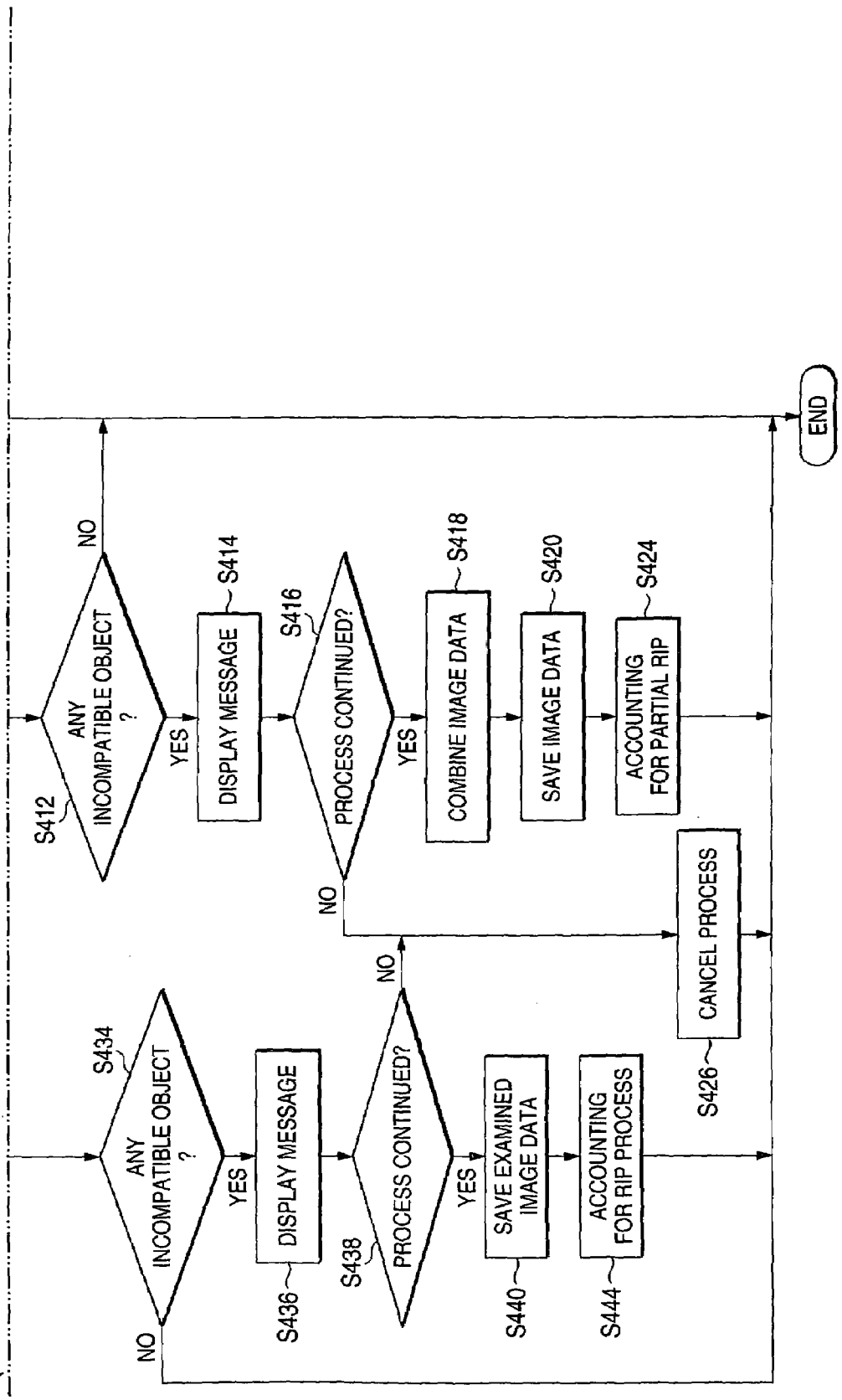

IMAGE PROCESSING APPARATUS AND METHOD

BACKGROUND OF THE INVENTION

1. Field of the Invention

The present invention relates to an accounting system and an accounting method for doing accounting for each of executed processes.

2. Background Art

For example, Systems for requesting image processing from a client to a server and executing the image processing in the server are known.

When such image processing is performed, there is a demand to do accounting for each process flexibly in accordance with the mode of the process.

In addition, similarly, there is a demand to do accounting for each process and each font data and the like used for the process flexibly in accordance with the mode of the process.

A system is considered as follows. That is, PCs of users are connected to a print system of a printing company through a network. Drawing data described in a language such as Postscript (Adobe Systems Incorporated™) is transmitted from each user to the printing company. A process (RIP (Raster Image Processing/Processor) process) for unfolding the drawing data into image data such as bitmap data is performed upon the drawing data in the printing company. Further, a color correction process and a print-out process are performed upon the image data.

In such a system, assume that the user is charged for the expenses for the RIP process or the like, for example, whenever the RIP process or the like is performed.

Assume that a series of processes to print out bitmap data subjected to the RIP process and the color correction process are performed normally. In this case, there is no particular problem when regular accounting is done for each process.

Further, the user may want to revise a portion of the document and print it again. In such a case, it is more advantageous and more profitable for the user to be charged not the same fee for the RIP process on the whole document but a fee for the RIP process on the revised portion.

On the other hand, for example, there may be a case where bitmap data can be indeed generated by a RIP process and a color correction process normally but cannot be printed normally due to a failure in network or the like. In such a case, a large and unprofitable burden may be imposed on a user when a fee equal to a regular fee for printing without failure is charged on the user who just makes a request for printing the same drawing data again due to the failure in network.

In addition, when bitmap data obtained in the first processing remains in the server performing such processes and the server reuses the bitmap data, there is no burden for a new RIP process and a new color correction process on the printing company.

SUMMARY OF THE INVENTION

The invention was developed in consideration of the problems belonging to the background art. It is an object of the invention to provide image processing apparatus and an image processing method by which a processing function is provided to a user, and accounting can be done on the user for each process and each piece of data required for the process flexibly in accordance with the mode of the process.

In the accounting method according to the invention, the fee to be charged for a process executed again is made lower than a regular fee or free in accordance with the contents of the process and the state of the process, such as whether the process has been terminated normally or abnormally. Thus, the burden on the user is relieved and the profit of the user is protected.

According to one aspect of the invention, in order to achieve the object there is provided an image processing apparatus including an image processing unit that performs a first image processing on image data including one or more image constituent parts, an incompatible part detection unit that executes an incompatibility detection processing, and an accounting unit that accounts for the executed incompatibility detection processing.

According to another aspect of the invention, in order to achieve the object there is provided an image processing method including performing a first image processing on image data including one or more image constituent parts, executing an incompatibility detection processing, and accounting for the executed incompatibility detection processing.

According to yet another aspect of the invention, in order to achieve the object there is provided a program for realizing a processing to a computer including performing a first image processing on image data including one or more image constituent parts, executing an incompatibility detection processing, and accounting for the executed incompatibility detection processing.

BRIEF DESCRIPTION OF THE DRAWINGS

The present invention may be more readily described with reference to the accompanying drawings:

FIG. 6 is a diagram showing a first normal sequence (S12) of the print system (FIG. 1);

FIG. 7 is a sequence diagram showing a first failure-in-printing operation (S14) in the print system (FIG. 1);

FIG. 8 is a sequence diagram showing a second failure-in-printing operation (S16) in the print system (FIG. 1);

FIG. 9 is a sequence diagram showing an operation (S18) in which bitmap data for display and bitmap data for printing are created in the image processing server (FIGS. 1 and 3);

FIG. 19 is a fifth diagram showing the outline of a RIP process in the print system shown in FIG. 14, by way of example;

DETAILED DESCRIPTION OF THE PREFERRED EMBODIMENTS

Figure 1:
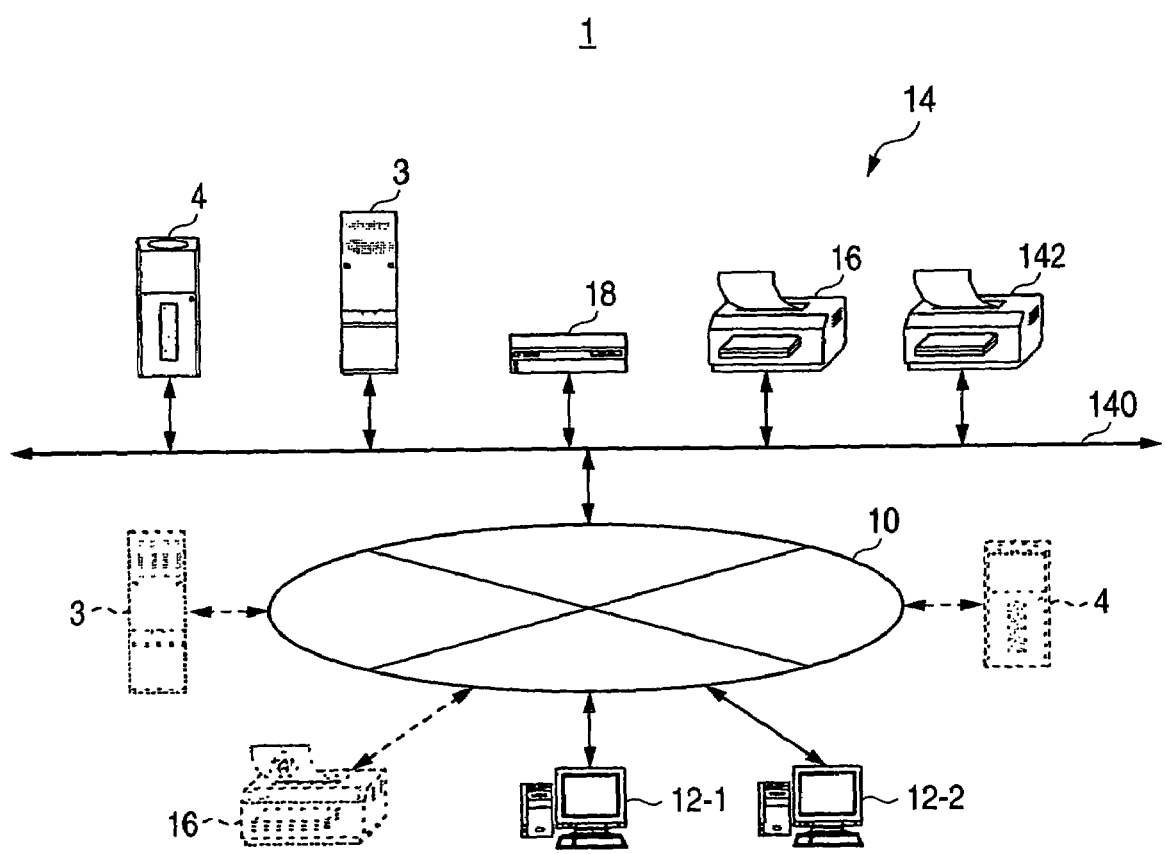
FIG. 1 is a diagram showing the configuration of a print system to which an accounting method according to the invention is applied, by way of example.

A first embodiment of the invention will be described below.

A print job which will be described below includes two processes, that is, a RIP process (possibly including color correction) and a print process to be performed by a printer. State information of each print job is recorded.

The state information is recorded in the form of a table in which each entry associated with a job ID of each print job includes image data (drawing data), profile ID of profile data (described later) used for RIP process, RIP-processed image data, RIP process time, printer serving for print process, print-out result, etc.

The image data generally includes image data such as a picture and code data such as drawing commands. In the following description, the image data will be also referred to as "image data (drawing data)" in order to clearly indicate both the image data and the code data.

When image data (drawing data) which has been once printed out is printed out again, its state information is retrieved, and a judgment is made as to whether there is image data (drawing data) whose name, contents and profile ID of profile data used for a previous RIP process coincide with those of the image data (drawing data) of the print job sent from the client PC, or not.

As a result of the judgment, it is found whether the same image data as the image data which will be obtained by performing a RIP process on the image data (drawing data) to be printed out this time has been already recorded or not.

When the same RIP-processed image data is present, the existing image data may be printed without performing the same RIP process again. Thus, the RIP process is omitted, and in this event, no accounting may be done for the RIP process, or the fee to be charged therefore may be discounted.

On the other hand, as a result of the judgment, it may be concluded that the same image data as the image data which will be obtained by performing a RIP process on the image data (drawing data) to be printed out this time has not been recorded. In such a case, the RIP process is executed again, and a regular fee is charged for the RIP process.

When the previous print process has been failed, the state information is retrieved in the same manner as in the event of reprinting, and a judgment is made as to whether there is recorded image data the same as the RIP-processed image data to be printed by the print job received from the client PC, or not.

When the same image data has been recorded, the RIP process is omitted in the same manner as in the event of reprinting. Thus, no accounting may be done for the RIP process, or the fee to be charged therefore may be discounted.

A series of processes including a RIP process, a color correction process and a print process will be also referred to as a process group.

The state information indicating whether a process group including a series of processes is terminated normally or not may be made up for each process included in the process group or may be made up for the process group as a whole.

FIG. 1 shows the configuration of a first print system 1 to which the accounting method according to the invention is applied, by way of example.

As shown in FIG. 1, the print system 1 is constituted by a LAN system 14 of a printing company or the like, and client PCs 12-1 to 12-m (m≧1; FIG. 1 shows the case of m=2 by way of example) of users of the LAN system 14, which are connected to the LAN system 14 through a network 10 such as a WAN or the Internet.

In order to simplify the illustration, lines showing the flow of data/information among the respective constituent parts are omitted appropriately in the following diagrams.

The LAN system 14 is constituted by an image processing server 3, an accounting server 4, a color measuring device 18, a printer 16 and a printing machine 142 to be used for printing (target printing) in large quantities. These servers and devices are connected through a LAN 140.

When any one of a plurality of constituent parts such as the client PCs 12-1 to 12-m does not have to be expressed specifically, the constituent part will be referred to below simply, for example, as a client PC 12.

The print system 1 uses these constituent parts so that the LAN system 14 provides each client PC 12 with its functions such as a RIP process, a color correction process and a print output, and accounting on each user is done in various modes whenever processing for implementing these functions is executed.

Figure 2:
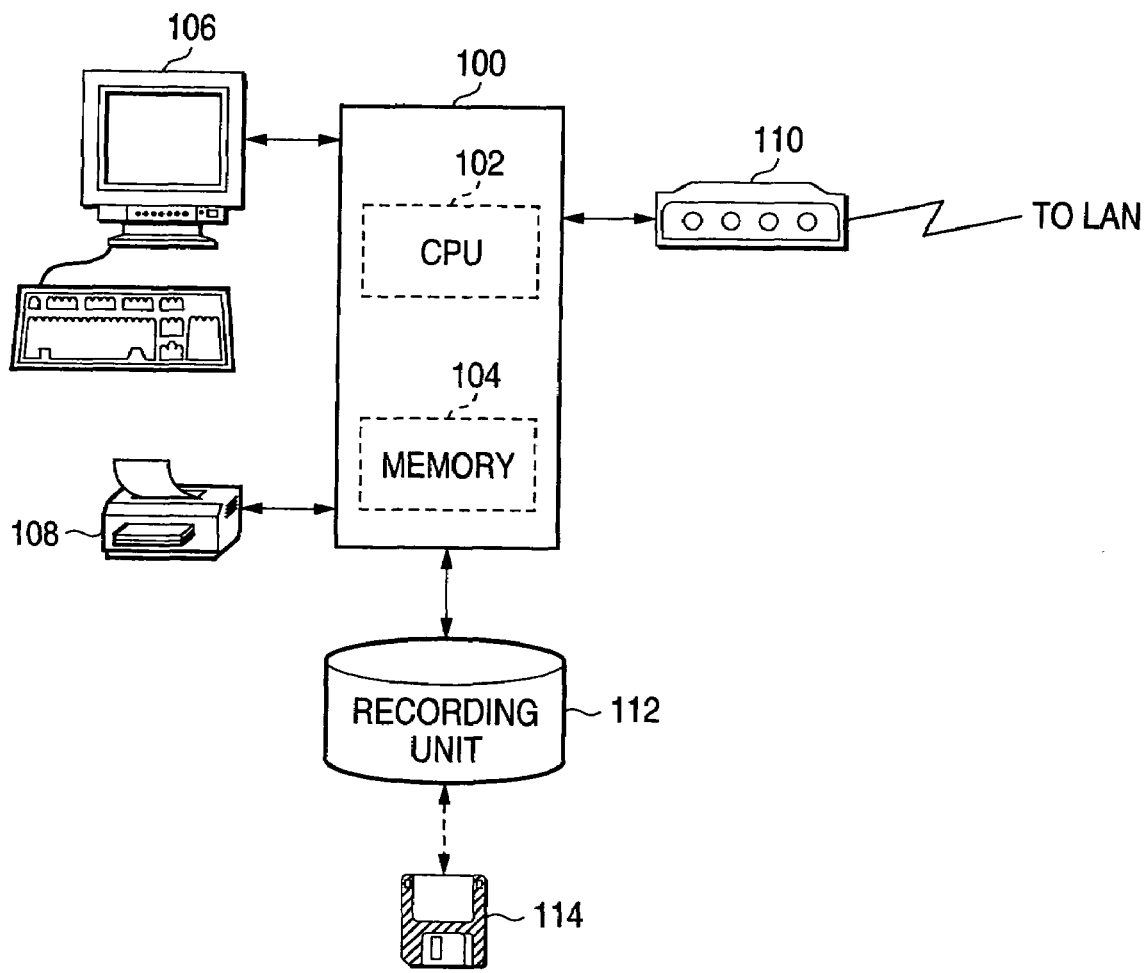
FIG. 2 is a diagram showing the hardware configuration of each of a client PC, a printer, a color measuring device, an image processing server and an accounting server shown in FIG. 1, by way of example.

FIG. 2 is a diagram showing the hardware configuration of each of the client PC 12, the printer 16, the color measuring device 18, the image processing server 3 and the accounting server 4 shown in FIG. 1, by way of example.

As shown in FIG. 2, the client PC 12 or the like is constituted by a PC or control unit body 100 including a CPU 102, a memory 104 and peripheral circuits of the CPU 102 and memory 104; a display/input unit 106 including a display unit, a keyboard, a mouse and so on; a function implementation portion 108 for implementing a function peculiar to the device itself, such as a printer engine in the printer 16; a communication unit 110 for implementing a communication function with the LAN 140 or the network 10; and a storage unit 112 such as an HDD unit and a CD unit.

That is, each of the client PC 12, the printer 16, the color measuring device 18, the image processing server 3 and the accounting server 4 includes constituent parts as a computer for making communications with other devices (hereinafter also referred to as "nodes") through the network 10 and the LAN 140.

The client PC 12 (FIGS. 1 and 2) sends image data to the LAN system 14 and makes a request to the LAN system 14 for a RIP process, a color correction process and a print-out process on the image data.

The color measuring device 18 measures the colors of printed matters obtained as a result of color printing with the printer 16 and the printing machine 142 for target printing.

Further, the color measuring device 18 generates device link profile data (DLP data) from parameters (target profile; TP data) indicating the color properties of the printer 16 and parameters (device profile; DP data) indicating the color properties of the printing machine 142 for real printing, and supplies the generated DLP data to the image processing server 3.

The DLP data is used for color correction on bitmap data so that a print result the same as that with the color properties of the printing machine 142 can be obtained by the printer 16.

Figure 3:
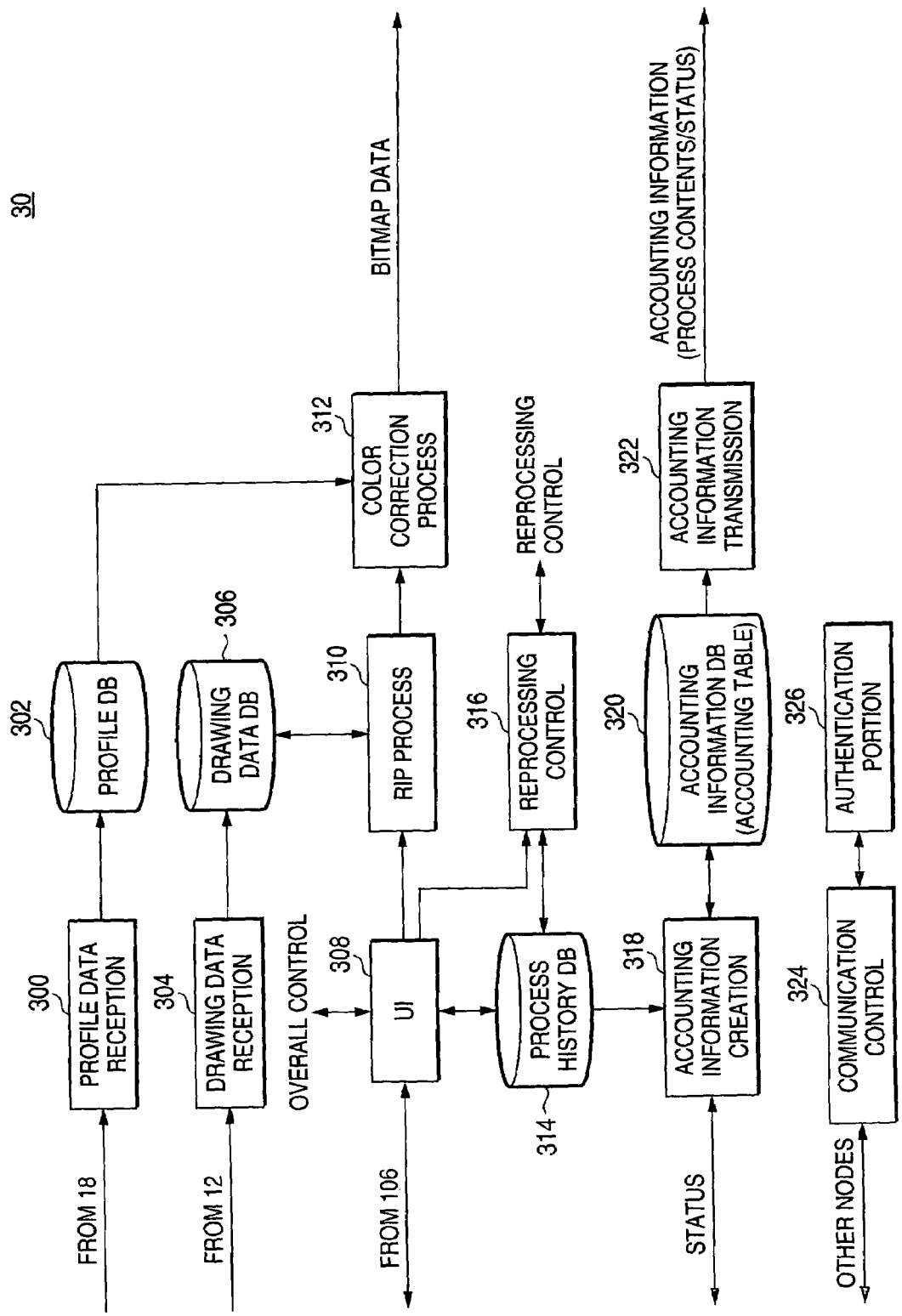
FIG. 3 is a diagram showing the configuration of a RIP/color correction program to be executed in the image processing server shown in FIGS. 1 and 2.

FIG. 3 is a diagram showing the configuration of a first RIP/color correction program 30 to be executed in the image processing server 3 shown in FIGS. 1 and 2.

As shown in FIG. 3, the RIP/color correction program 30 is constituted by a target profile data receiving portion (profile data receiving portion) 300, a profile database (profile DB) 302, a drawing data receiving portion 304, a drawing data DB 306, a user interface portion (UI portion) 308, a RIP processing portion 310, a color correction processing portion 312, a process history DB 314, a reprocessing control portion 316, an accounting information creation portion 318, an accounting information DB 320 and an accounting information transmitting portion 322.

In order to simplify the illustration, lines showing the flow of information/data are omitted appropriately in FIG. 3.

The RIP/color correction program 30 is supplied to the image processing server 3, for example, through a recording medium 114 (FIG. 2), loaded onto the memory 104 and executed.

The RIP/color correction program 30 uses these constituent parts to perform a RIP process and a color correction process upon image data supplied from the client PC 12.

In addition, the RIP/color correction program 30 creates accounting information (accounting information and status information) required for accounting, and supplies the created accounting information to the accounting server 4.

The profile data receiving portion 300 receives DLP data of the printer 16 from the color measuring device 18 (FIGS. 1 and 2), and stores the received DLP data into the profile DB 302.

The drawing data receiving portion 304 receives, from the client PC 12, drawing data described in a format of a printing language such as Postscript (Adobe Systems Incorporated™), and stores the received drawing data into the drawing data DB 306.

The UI portion 308, for example, provides the client PC 12 with a UI image for operating the image processing server 3 (RIP/color correction program 30) and the printer 16, accepts the operation of the user on the UI image, and supplies the accepted operation to the RIP processing portion 310.

In addition, the UI portion 308 accepts the operation of the user from the client PC 12, creates process contents information indicating the contents of a process requested to the image processing server 3 and the printer 16, and stores the created process contents information into the accounting information DB 320.

In addition, the UI portion 308 controls processing of each constituent part of the RIP/color correction program 30 on the basis of the operation of the user accepted as described above.

In addition, the UI portion 308 stores the history of the accepted user's operation into the process history DB 314.

The RIP processing portion 310 performs a RIP process upon drawing data stored in the drawing data DB 306 in accordance with the operation of the user accepted through the UI portion 308, so as to generate bitmap data for printing.

The RIP processing portion 310 supplies the generated bitmap data to the color correction processing portion 312, and stores the bitmap data into the drawing data DB 306 in accordance with necessity.

If necessary, the color correction processing portion 312 performs a color correction process using the DLP data stored in the profile DB 302, upon the bitmap data supplied from the RIP processing portion 310 or the bitmap data obtained as a result of retrieval over the drawing data DB 306, in accordance with the operation of the user accepted through the UI portion 308.

The color correction processing portion 312 supplies the color-corrected bitmap data to the printer 16, and stores the color-corrected bitmap data into the drawing data DB 306 in accordance with necessity.

Alternatively, when the RIP/color correction program 30 creates bitmap data to be displayed on the display/input unit 106 of the client PC 12, the color correction processing portion 312 supplies the bitmap data to the client PC 12.

When a request to re-execute a previous failed process is issued from the client PC 12 through the UI portion 308, the reprocessing control portion 316 obtains an optimal reprocessing method with reference to the process contents information, the status information and the like stored in the process history DB 314, and re-executes the process in the obtained optimal reprocessing method.

For example, when the drawing data received from the client PC 12 remains in the drawing data DB 306, the reprocessing control portion 316 controls each constituent part of the RIP/color correction program 30 and the printer 16 so as to perform a series of processes of a RIP process, a color correction process and a print-out process upon the remaining drawing data.

On the other hand, for example, when bitmap data subjected to the RIP process and the color correction process remains in the drawing data DB 306, the reprocessing control portion 316 controls each constituent part of the RIP/color correction program 30 and the printer 16 so as to perform a print-out process upon the remaining bitmap data.

The accounting information creation portion 318 processes the history of user's operations stored in the process history DB 314, status information such as success/failure in printing replied from the printer 16, and so on, so as to create process contents information indicating the contents of the process requested from the user and status information indicating the state of the process. Thus, the accounting information creation portion 318 stores the process contents information and the status information into the accounting information DB 320.

The process contents information created by the accounting information creation portion 318 includes general information giving influence to the fee to be charged, such as the number of prints, the distinction of color/monochrome print and the designation of print quality requested to the printer 16.

On the other hand, the status information created by the accounting information creation portion 318 includes, for example, general information that can be the reason for changing the fee to be charged, as follows.

(1-1) Information (number-of-times information) indicating whether an executed process as a target of accounting is a process performed for the first time or how many times the same process has been performed.

(1-2) Information (reprocessing information) indicating whether an executed process as a target of accounting is a process obtained by re-execution of a process once failed for some reason.

(1-3) Information (reprocessing reason information) indicating why a process previous to a re-executed process as a target of accounting was failed.

The information (1-3) includes, for example, information indicating running out of paper, running out of toner or paper jam in the printer 16. Such information is included in a notice from the printer 16 when the printer 16 fails in a print-out process.

(1-4) Information (related process information) indicating the existence of a process related to an executed process as a target of accounting.

The related process information indicates, for example, whether bitmap data as a target of a display process for displaying the bitmap data on the client PC 12 was data subjected to related RIP process/color correction process or not, or whether the bitmap data was bitmap data created for the display process or not.

(1-5) Information (reprocessing method information) indicating what method the reprocessing control portion 316 used for reprocessing.

(1-6) Information (successful process information) indicating whether each process of a plurality of executed processes as targets of accounting was successful or not.

The accounting information transmitting portion 322 supplies the accounting server 4 with the accounting information (process contents information and status information) stored in the accounting information DB 320.

A communication control portion 324 controls communications with other nodes so as to implement the communication sequence shown in FIG. 6 and so on.

An authentication portion 326 performs an authentication process for a client PC 12 making a request to the image processing server 3 for processing.

Figure 4:
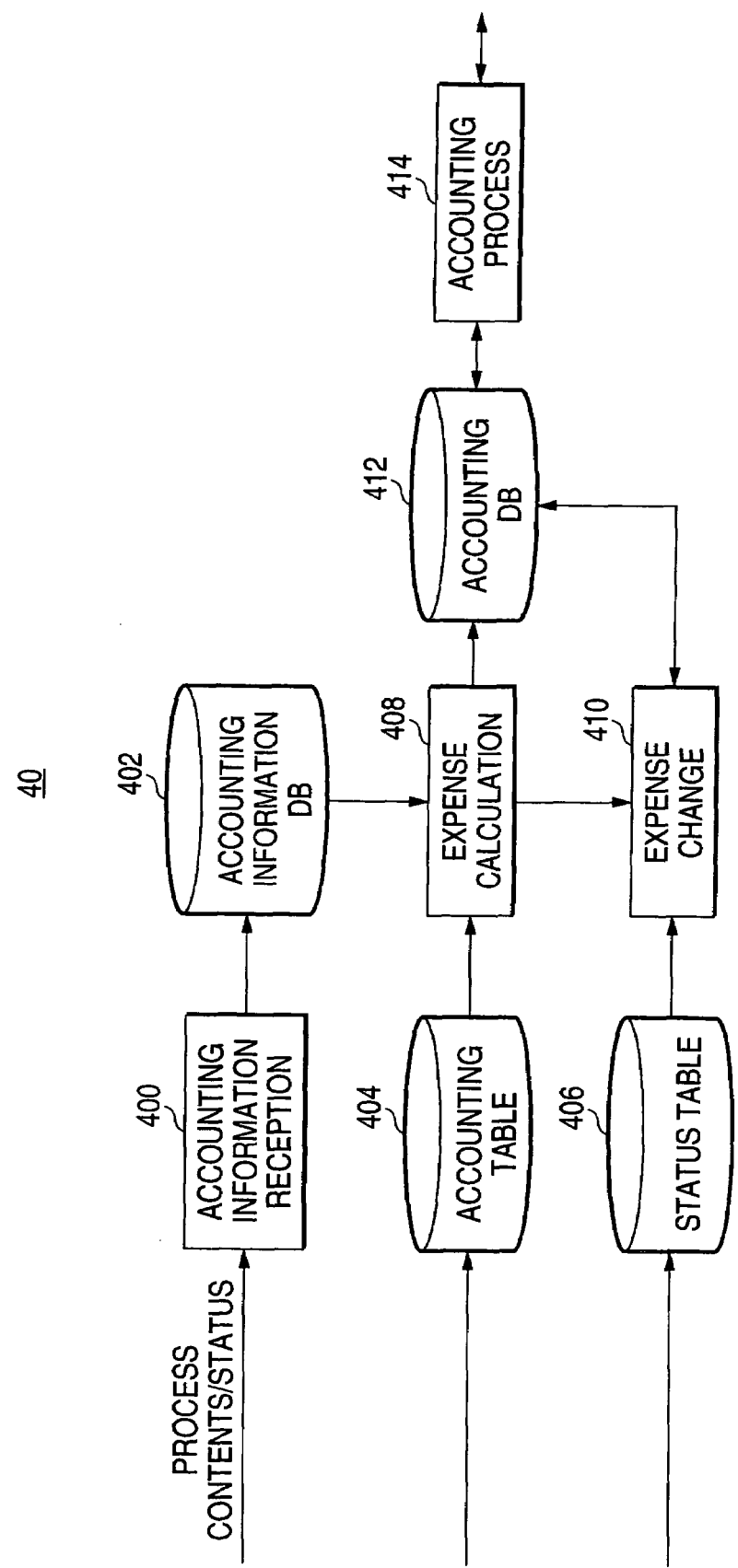
FIG. 4 is a diagram showing the configuration of an accounting program to be executed in the accounting server shown in FIGS. 1 and 2.

FIG. 4 is a diagram showing the configuration of an accounting program 40 to be executed in the accounting server 4 shown in FIGS. 1 and 2.

As shown in FIG. 4, the accounting program 40 is constituted by an accounting information receiving portion 400, an accounting information DB 402, an accounting table 404, a status table 406, an expense calculating portion 408, an expense changing portion 410, an accounting DB 412 and an accounting processing portion 414.

The accounting program 40 is supplied to the accounting server 4, for example, through a recording medium 114 (FIG. 2), loaded onto the memory 104 and executed.

The accounting program 40 uses these constituent parts to calculate expenses for each process performed by the image processing server 3 (RIP/color correction program 30), on the basis of the accounting information (process contents information) supplied from the image processing server 3.

In addition, using the accounting information (status information) supplied from the image processing server 3, the accounting program 40 reduces the calculated expenses or makes the expenses free in accordance with necessity, or increases the expenses in a special case such as the case where there is added another process during processing.

The accounting information receiving portion 400 receives the accounting information from the image processing server 3, and stores the received accounting information into the accounting information DB 402.

The accounting table 404 is, for example, supplied from the outside through the recording medium 114 (FIG. 2), or set by the operation of a user of the accounting server 4 on the display/input unit 106.

The accounting table 404 holds a unit expense for each item of the process contents information received from the image processing server 3, and supplies the unit expenses to the expense calculating portion 408.

That is, for example, the accounting table 404 stores each combination of a plurality of items such as the item "print quality" and the item "color/monochrome print", and unit expense data for a RIP process, a color correction process and a print-out process corresponding to each item, and supplies the combinations and the unit expenses to the expense calculating portion 408.

The expense calculating portion 408 calculates expenses for each process indicated by the process contents information with reference to the data of unit expenses stored in the accounting table 404.

The expense calculating portion 408 supplies the expense changing portion 410 with the expenses of each process obtained as a result of the calculation and arranged for each user of the client PC 12, or stores the expenses into the accounting DB 412.

The status table 406 is supplied from the outside through the recording medium 114 (FIG. 2) or set by the operation of the user of the accounting server 4 on the display/input unit 106 in the same manner as the accounting table 404.

The status table 406 stores change data indicating a discount rate of expenses, an extra rate of expenses or no expense charge for each combination in the status information, and supplies the change data to the expense changing portion 410.

The expense changing portion 410 changes the expenses for each process supplied from the expense calculating portion 408 or the expenses for each process read from the accounting DB 412 with reference to the change data of the status table 406, arranges the expenses for each user of the client PC 12, and stores the arranged expenses into the accounting DB 412.

Figure 5:
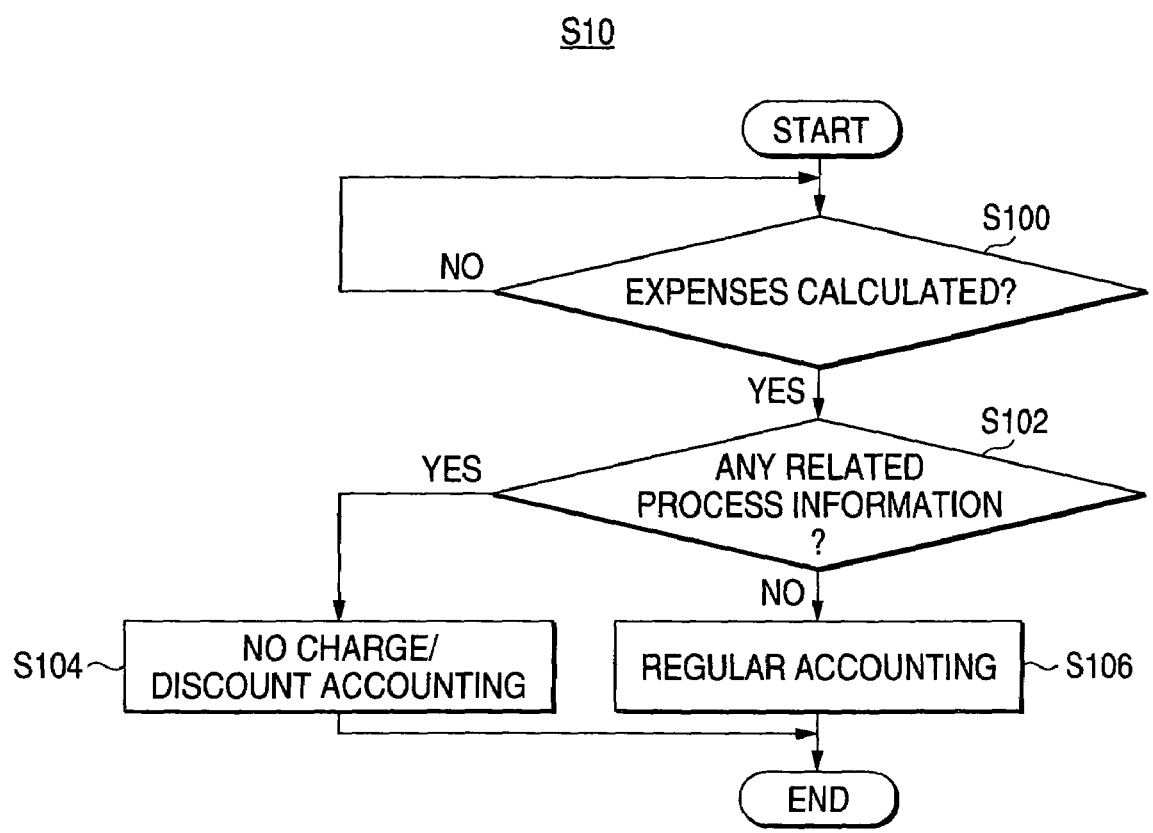
FIG. 5 is a flow chart showing a process (S10) of an expense changing portion of the accounting program shown in FIG. 4.

With reference to FIG. 5, description will be made further on the processing of the expense changing portion 410 in an exemplary case where a judgment is made upon the related process information included in the status information.

FIG. 5 is a flow chart showing a process (S10) of the expense changing portion 410 of the accounting program 40 shown in FIG. 4.

As shown in FIG. 5, in Step 100 (S100), the expense changing portion 410 judges whether the expenses have been calculated by the expense calculating portion 408 or not.

The expense changing portion 410 advances to the processing of S102 when the expenses have been calculated. Otherwise the expense changing portion 410 stays in the processing of S100.

In Step 102 (S102), the expense changing portion 410 judges whether related process information is included in the status information corresponding to the process whose expenses have been calculated, or not.

The expense changing portion 410 advances to the processing of S104 when the related process information is present. Otherwise the expense changing portion 410 skips to the processing of S106.

In Step 104 (S104), the expense changing portion 410 changes the regular expenses calculated by the expense calculating portion 408 with reference to the change data of the status table 406, and stores the changed expenses into the accounting DB 412.

For the process as a target of expense calculation, the accounting DB 412 charges the user of the client PC 12 the discounted expenses stored in the accounting DB 412, or sets the expenses as no charge.

In Step 106 (S106), with reference to the change data of the status table 406, the expense changing portion 410 does not change the regular expenses calculated by the expense calculating portion 408, and stores the regular expenses into the accounting DB 412.

For the process as a target of expense calculation, the accounting DB 412 charges the user of the client PC 12 the regular expenses stored in the accounting DB 412.

The process shown in FIG. 5 is shared among respective pieces of information included in the status information. When the status information includes a plurality of pieces of information, the process shown in FIG. 5 is performed upon a combination of the plurality of pieces of information.

The general operation of the print system 1 will be described below with reference to FIGS. 6 to 9.

Each sequence shown in FIG. 6 to FIG. 9 is an exemplification for making the invention concrete and facilitating understanding of the invention. The operation of the print system 1 is not limited to such exemplifications.

First, description will be made on the operation in which a RIP process and/or a color correction process (a RIP/color correction process) on drawing data and a print-out process are performed normally in the print system 1.

Processes shown in the following embodiments can be executed in combination with each other unless they contradict each other or when they are modified appropriately.

FIG. 6 is a diagram showing a first normal sequence (S12) of the print system 1 (FIG. 1).

As shown in FIG. 6, an authentication process is executed between the client PC 12 and the image processing server 3 (RIP/color correction program 30; FIG. 3). Thus, the image processing server 3 authenticates the client PC 12.

The client PC 12 specifies the contents of a RIP/color correction process, a print-out process and the like (print job), transmits drawing data as a target of these processes (S120 and S122).

The print job includes information indicating a job ID, an ID for specifying a user name and DLP data, and so on, as well as information indicating the contents of the RIP/color correction process and the print-out process (print job).

The UI portion 308 of the RIP/color correction program 30 creates process contents information indicating the contents of the print job, and stores the process contents information into the accounting information DB 320.

The image processing server 3 performs a RIP/color correction process in accordance with the process contents specified by the client PC 12 so as to create bitmap data (BM data). Thus, the image processing server 3 supplies the bitmap data to the printer 16 while specifying a printing method (S124).

The printer 16 prints the bitmap data from the image processing server 3. When the printing is terminated normally, the printer 16 notifies the image processing server 3 of success in printing (S126).

The image processing server 3 supplies the accounting server 4 (accounting program 40; FIG. 4) with accounting information including the process contents information and number-of-times information or the like (status information) showing that the printing is successful and the process as a target of accounting is a process performed for the first time (S128).

The image processing server 3 notifies the client PC 12 of the success in printing (S130).

Receiving the accounting information, the accounting server 4 performs a process for charging a regular fee on the user of the client PC 12 (S132).

More in particular, for example, the accounting program 40 charges the client PC 12 the regular expenses for the RIP/color correction process and the regular expenses for the print-out process.

Next, description will be made on the operation in the print system 1 in which a RIP/color correction process upon drawing data is successful but a print-out process is failed.

FIG. 7 is a sequence diagram showing a first failure-in-printing operation (S14) in the print system 1 (FIG. 1).

Of the steps in the sequence shown in FIG. 7, ones substantially the same as those in the sequence shown in FIG. 6 are denoted by the same reference numerals correspondingly.

As shown in FIG. 7, the client PC 12 transmits a print job and drawing data to the image processing server 3, and the image processing server 3 transmits the printer 16 bitmap data obtained as a result of a RIP/color correction process (S120-S124).

Assume that the printer 16 fails in printing the bitmap data received from the image processing server 3 (RIP/color correction program 30; FIG. 3) for some reason. In such a case, the printer 16 notifies the image processing server 3 of failure in printing (S140).

The notice of the failure in printing includes information indicating the reason (running out of paper, paper jam, running out of toner, etc.) why the printing was failed.

The image processing server 3 supplies the accounting server 4 (accounting program 40; FIG. 4) with accounting information including process contents information and status information including successful process information or the like showing that the RIP/color correction process was successful but the print-out process was failed (S142).

The image processing server 3 notifies the client PC 12 of the failure in printing (S144).

Receiving the accounting information, the expense changing portion 410 of the accounting server 4 discounts the expenses calculated by the expense calculating portion 408 and stored in the accounting DB 412, and the accounting processing portion 414 performs a discount accounting process on the user of the client PC 12 (S146).

More in particular, for example, when the print process is failed due to the LAN system 14, the accounting program 40 charges the client PC 12 discounted expenses for the RIP/color correction process.

As described previously, the status information (state information) indicating success/failure in processing may be created for each process of a series of plural processes or for the series of plural processes (process group) as a whole.

The designer of the system can choose desirably which status information to use, status information for each process or status information for the process group as a whole, in accordance with the configuration of the system or the contents of the processes.

For example, when it is necessary to manage the state of each process of plural processes belonging to a process group in an accounting process or the like, status information may be generated for each process.

On the other hand, when a print job specified by a user is executed as a process group and one process is failed but it is necessary to notify the user of a failure in the process group as a whole, status information may be generated for the process group as a whole.

Next, description will be made on the operation in the print system 1 in which a RIP/color correction process upon drawing data is successful but a print-out process is failed and the process is executed again.

FIG. 8 is a sequence diagram showing a second failure-in-printing operation (S16) in the print system 1 (FIG. 1).

Of the steps in the sequence shown in FIG. 8, ones substantially the same as those in the sequence shown in FIGS. 6 and 7 are denoted by the same reference numerals correspondingly.

As shown in FIG. 8, the client PC 12 transmits a print job and drawing data to the image processing server 3, and the image processing server 3 transmits the printer 16 bitmap data obtained as a result of a RIP/color correction process (S120-S124).

Assume that the printer 16 fails in printing the bitmap data received from the image processing server 3 (RIP/color correction program 30; FIG. 3) for some reason. In such a case, the printer 16 notifies the image processing server 3 of failure in the first-time printing (S160).

The image processing server 3 notifies the client PC 12 of the failure in printing (S162).

When the user of the client PC 12 makes a request to the image processing server 3 for re-execution (second-time print job) of the same process as the process failed in printing (S164) previously, the reprocessing control portion 316 of the RIP/color correction program 30 selects an optimal reprocessing method.

For example, the reprocessing control portion 316 may select a method in which the bitmap data stored in the drawing data DB 306 and already subjected to the RIP/color correction process is transmitted to the printer 16 and printed by the printer 16. In this case, the color correction processing portion 312 reads the bitmap data from the drawing data DB 306 and supplies the bitmap data to the printer 16 (S166).

The printer 16 prints the bitmap data from the image processing server 3. When the printing is terminated normally, the printer 16 notifies the image processing server 3 of success in printing (S168).

The image processing server 3 supplies the accounting server 4 (accounting program 40; FIG. 4) with accounting information including process contents information and status information including reprocessing information, reprocessing reason information and the like showing that printing once failed and then re-executed was successful (S170).

The image processing server 3 notifies the client PC 12 of the success in printing (S172).

Receiving the accounting information, the expense changing portion 410 of the accounting server 4 discounts the expenses calculated by the expense calculating portion 408 and stored in the accounting DB 412, and the accounting processing portion 414 performs a discount accounting process on the user of the client PC 12 (S174).

More in particular, for example, the accounting program 40 charges the client PC 12 the regular expenses for the first-time RIP/color correction process, the discounted expenses for the second-time RIP/color correction process, and the regular expenses for the print-out process.

Description will be made below on the operation of the print system 1 for creating bitmap data to be displayed on the display/input unit 106 (FIG. 2) of the client PC 12 and bitmap data to be printed out in the printer 16.

FIG. 9 is a sequence diagram showing an operation (S18) in which bitmap data for display and bitmap data for printing are created in the image processing server 3 (FIGS. 1 and 2).

As shown in FIG. 9, the client PC 12 supplies the image processing server 3 with a display job indicating a process for creating bitmap data to be displayed on the display/input unit 106 of the client PC 12, and drawing data (S180 and S182)

The image processing server 3 (RIP/color correction program 30; FIG. 3) creates bitmap data for display, and supplies the created bitmap data to the client PC 12 (S184).

When succeeding in displaying the bitmap data from the image processing server 3, the client PC 12 notifies the image processing server 3 of the success in display (S188).

The image processing server 3 transmits the accounting server 4 with process contents information and status information including successful process information indicating the success in the RIP/color correction process for the bitmap data for display (S190).

The accounting server 4 (accounting program 40; FIG. 4) does regular accounting on the client PC 12 for the RIP/color correction process for the bitmap data for display (S192).

The client PC 12 supplies the image processing server 3 with a print job and drawing data the same as the drawing data (display data) received in the processing of S182 (S194 and S196).

For example, based on an explicit instruction from the user of the client PC 12, comparison between the display data (S182) and the drawing data (S196) and comparison between the display job and the print job, or the like, the reprocessing control portion 316 judges whether the display job coincides with the drawing job or not.

When the reprocessing portion 316 concludes that these jobs coincide with each other, the reprocessing portion 316 associates the jobs with each other as related processes.

For example, when the bitmap data created for executing the display job remains in the drawing data DB 306, the reprocessing control portion 316 supplies the bitmap data to the printer 16 (S198).

When succeeding in the print-out process of the bitmap data from the image processing server 3, the printer 16 notifies the image processing server 3 of the success in printing (S200).

The image processing server 3 supplies the accounting server 4 (accounting program 40; FIG. 4) with process contents information and status information including related process information showing the display job and the print job are related processes (S202).

The image processing server 3 notifies the client PC 12 of the success in printing (S204).

The accounting server 4 charges a fee obtained by discounting an amount from the regular expenses on the client PC 12 (S206).

More in particular, for example, the accounting program 40 does not charge the client PC 12 the expenses for the first-time RIP/color correction process in the print job but charges the client PC 12 only the expenses for the print-out process.

Each apparatus included in the LAN system 14, such as the accounting server 4, maybe connected directly to the network 10 as shown by the broken line in FIG. 1.

The image processing server 3 and the printer 16 may be arranged integrally.

Functions shared among the constituent parts (nodes) included in the print system 1, such as the LAN system 14 and the image processing server 3, are merely exemplifications. A part of the function of the image processing server 3 may be shared by the client PC 12. The functions may be shared desirably among the nodes.

The details described here may be applied to the following embodiments.

A second embodiment of the invention will be described below.

As will be described below, in the second embodiment, processing is changed as follows. That is, as soon as the image processing server 3 receives a print job and the like from the client PC 12, the image processing server 3 transmits process contents information to the accounting server 4. However, the image processing server 3 transmits status information to the accounting server 4 in response to a notice of the result of a print-out process from the printer 16.

In addition, in the second embodiment, processing is also changed as follows. That is, receiving the print contents information from the image processing server 3, the accounting server 4 generates temporary accounting information and registers it. The accounting server 4 sets the temporary accounting information as final accounting information after receiving the status information.

Figure 10:
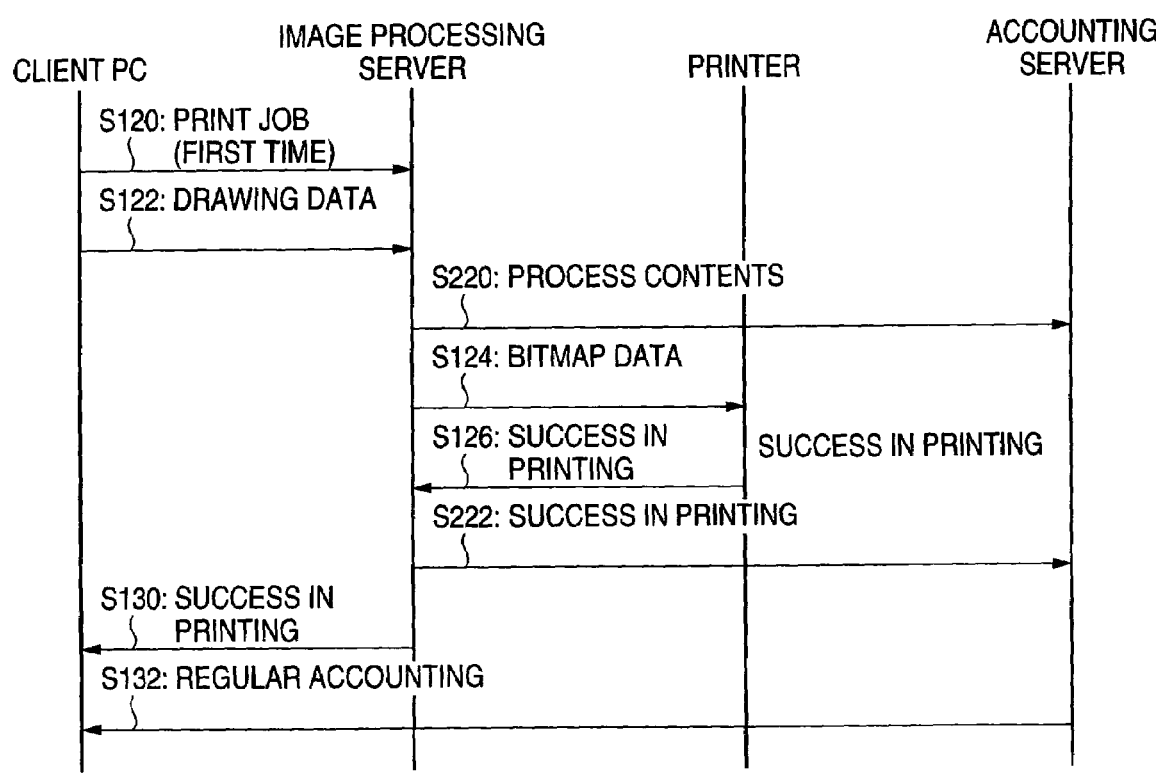
FIG. 10 is a diagram showing a second normal sequence (S22) of the print system (FIG. 1)

FIG. 10 is a diagram showing a second normal sequence (S22) of the print system 1 (FIG. 1).

Of the steps in the sequence shown in FIG. 10, ones substantially the same as those in the sequence shown in FIG. 6 are denoted by the same reference numerals correspondingly.

As shown in FIG. 10, the client PC 12 specifies the contents of a print job, and transmits drawing data to be processed (S120 and S122).

The UI portion 308 of the RIP/color correction program 30 creates process contents information indicating the contents of the print job, and stores the process contents information into the accounting information DB 320.

The accounting information transmitting portion 322 supplies the accounting server 4 with accounting information including the process contents information stored in the accounting information DB 320 (S220).

The image processing server 3 processes the drawing data in accordance with the process contents specified by the client PC 12 so as to create bitmap data. Thus, the image processing server 3 supplies the bitmap data to the printer 16 while specifying a printing method (S124).

The printer 16 prints the bitmap data from the image processing server 3. When the printing is terminated normally, the printer 16 notifies the image processing server 3 of success in printing (S126).

The image processing server 3 supplies the accounting server 4 (accounting program 40; FIG. 4) with accounting information including number-of-times information or the like (status information) showing that the printing is successful and the process to be charged is a process performed for the first time (S222).

The image processing server 3 notifies the client PC 12 of the success in printing (S130).

Receiving the accounting information, the accounting server 4 performs a process for charging a regular fee on the user of the client PC 12 (S132).

Next, description will be made on the operation in the print system 1 in which a RIP/color correction process upon drawing data is successful but a print-out process is failed.

Figure 11:
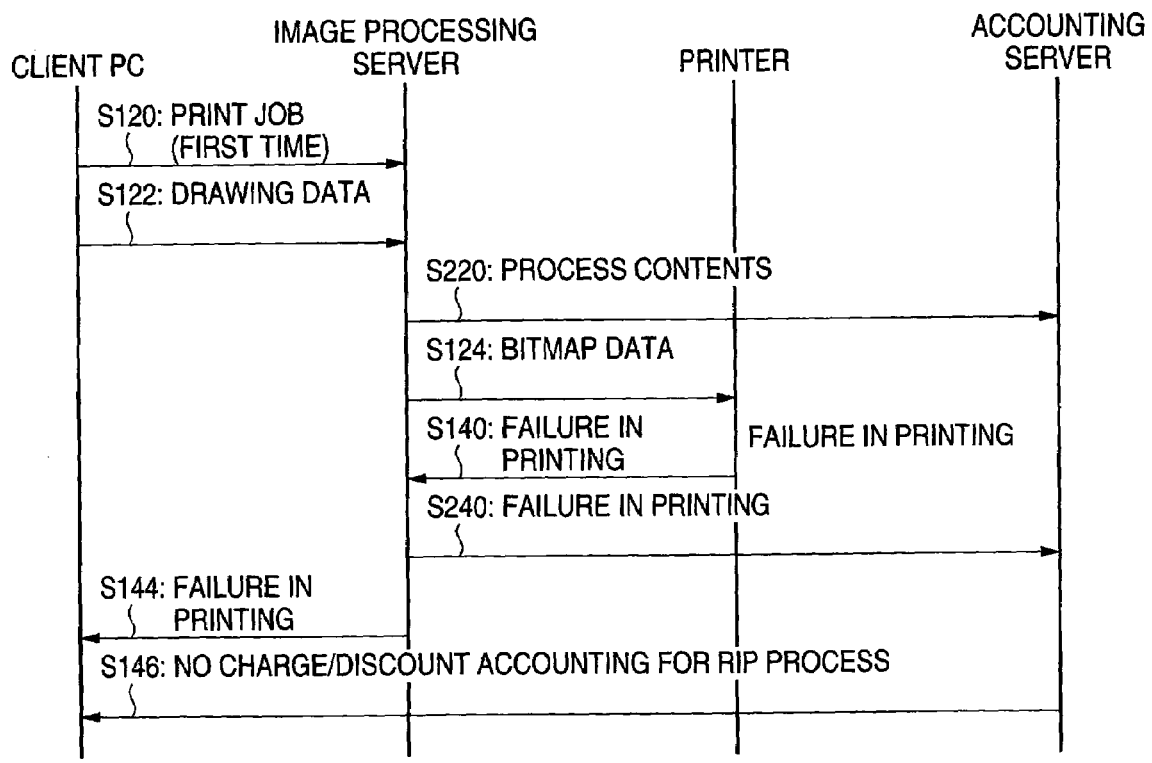
FIG. 11 is a sequence diagram showing a third failure-in-printing operation (S24) in the print system (FIG.

FIG. 11 is a sequence diagram showing a third failure-in-printing operation (S24) in the print system 2 (FIG. 1).

Of the steps in the sequence shown in FIG. 11, ones substantially the same as those in the sequence shown in FIGS. 6 and 7 are denoted by the same reference numerals correspondingly.

As shown in FIG. 11, the client PC 12 transmits a print job and drawing data to the image processing server 3, and the image processing server 3 transmits the printer 16 bitmap data obtained as a result of a RIP/color correction process (S120-S124).

The UI portion 308 of the RIP/color correction program 30 creates process contents information indicating the contents of the print job, and stores the process contents information into the accounting information DB 320.

The accounting information transmitting portion 322 supplies the accounting server 4 with accounting information including the process contents information stored in the accounting information DB 320 (S220).

Assume that the printer 16 fails in printing the bitmap data received from the image processing server 3 (RIP/color correction program 30; FIG. 3). In such a case, the printer 16 notifies the image processing server 3 of failure in printing (S140).

The image processing server 3 supplies the accounting server 4 (accounting program 40; FIG. 4) with accounting information including successful process information or the like (status information) showing that the RIP/color correction process was successful but the print-out process was failed (S240).

The image processing server 3 notifies the client PC 12 of the failure in printing (S144).

Receiving the accounting information, the expense changing portion 410 of the accounting server 4 discounts the expenses calculated by the expense calculating portion 408 and stored in the accounting DB 412, and the accounting processing portion 414 performs a discount accounting process on the user of the client PC 12 (S146).

As described above, when the image processing server 3 changes the contents properly, it is possible to change the timing with which the accounting information is transmitted from the image processing server 3 to the accounting server 4.

Description will be made below on a temporary accounting process in which the expense calculating portion 408 of the accounting program 40 (FIG. 4) operating on the accounting server 4 (FIGS. 1 and 2) registers a temporary fee in the accounting DB 412.

This temporary accounting process is adapted to the print system 1 in the following case. That is, as shown in FIG. 10 or 11, the image processing server 3 transmits process contents information to the accounting server 4 as soon as the image processing server 3 receives a print job or the like, and the image processing server 3 transmits accounting information including status information to the accounting server 4 when the image processing server 3 receives a result of a print-out process.

Figure 12:
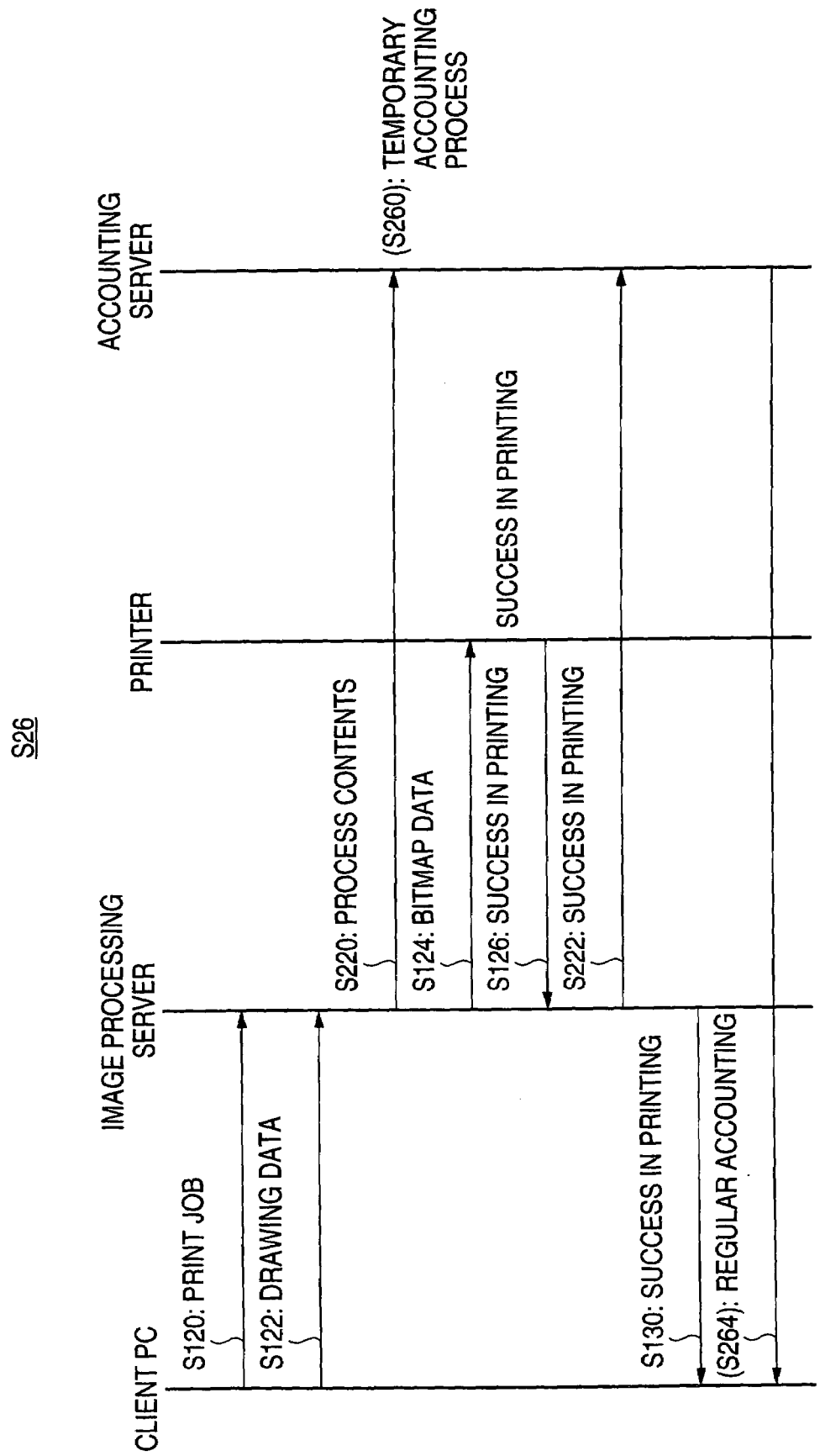
FIG. 12 is a diagram showing a third normal sequence (S26) of the print system (FIG. 1)

FIG. 12 is a diagram showing a third normal sequence (S26) of the print system 1 (FIG. 1).

Of the steps in the sequence shown in FIG. 12, ones substantially the same as those in the sequence shown in FIGS. 6 and 10 are denoted by the same reference numerals correspondingly.

As shown in FIG. 12, the client PC 12 specifies the contents of a print job, and transmits drawing data to be processed (S120 and S122).

The UI portion 308 of the RIP/color correction program 30 creates process contents information indicating the contents of the print job, and stores the process contents information into the accounting information DB 320.

The accounting information transmitting portion 322 supplies the accounting server 4 with accounting information including the process contents information stored in the accounting information DB 320 (S220).

In this stage, the expense calculating portion 408 of the accounting program 40 (FIG. 4) calculates the regular expenses for the print job terminated normally, and temporarily stores (registers) the calculated regular expenses into the accounting DB 412 as a temporary fee (S260).

The image processing server 3 processes the drawing data in accordance with the process contents specified by the client PC 12 so as to create bitmap data. Thus, the image processing server 3 supplies the bitmap data to the printer 16 while specifying a printing method (S124).

The printer 16 prints the bitmap data from the image processing server 3. When the printing is terminated normally, the printer 16 notifies the image processing server 3 of success in printing (S126).

The image processing server 3 supplies the accounting server 4 (accounting program 40; FIG. 4) with accounting information including number-of-times information or the like (status information) showing that the printing is successful and the process to be charged is a process performed for the first time (S222).

The image processing server 3 notifies the client PC 12 of the success in printing (S130).

Receiving the accounting information, the expense changing portion 410 of the accounting program 40 (FIG. 4) sets the regular fee temporarily registered in the accounting DB 412 to be a final fee in the processing of S260.

The accounting processing portion 414 charges the user of the client PC 12 the final regular fee (S264).

Description will be made below on the case where the printer 16 fails in printing when a temporary accounting process is performed in the accounting server 4.

Figure 13:
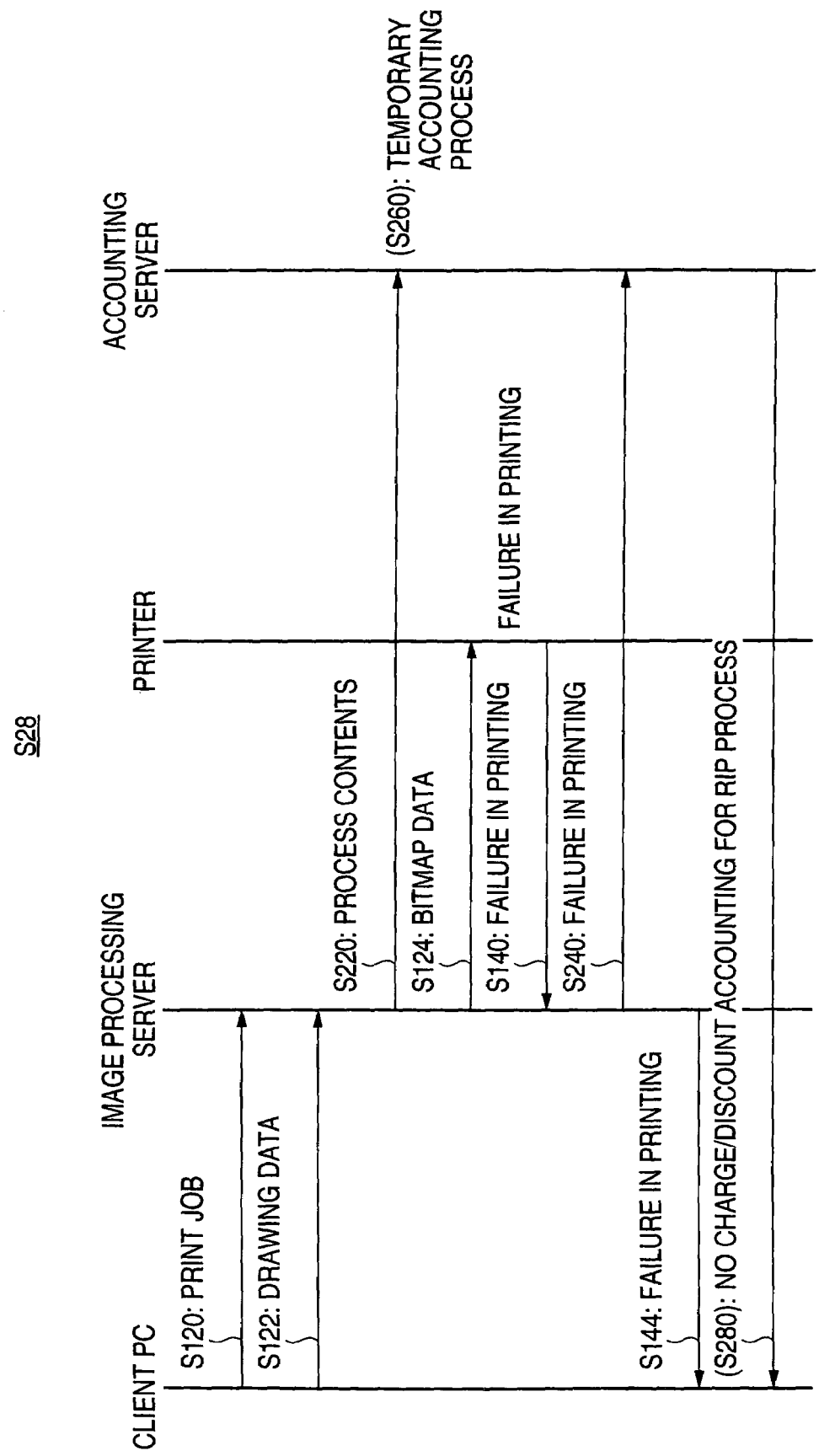
FIG. 13 is a sequence diagram showing a fourth failure-in-printing operation (S28) in the print system (FIG. 1)

FIG. 13 is a sequence diagram showing a fourth failure-in-printing operation (S28) in the print system 1 (FIG. 1).

Of the steps in the sequence shown in FIG. 13, ones substantially the same as those in the sequence shown in FIGS. 6 and 10 to 12 are denoted by the same reference numerals correspondingly.

As shown in FIG. 13, the client PC 12 specifies the contents of a print job and transmits drawing data to be processed (S120 and S122).

The UI portion 308 of the RIP/color correction program 30 creates process contents information indicating the contents of the print job, and stores the process contents information into the accounting information DB 320.

The accounting information transmitting portion 322 supplies the accounting server 4 with accounting information including the process contents information stored in the accounting information DB 320 (S220).

In this stage, the expense calculating portion 408 of the accounting program 40 (FIG. 4) calculates the expenses for the print job terminated normally, and registers the calculated expenses into the accounting DB 412 as a temporary fee (S260).

The image processing server 3 processes the drawing data in accordance with the process contents specified by the client PC 12 so as to create bitmap data. Thus, the image processing server 3 supplies the bitmap data to the printer 16 while specifying a printing method (S124).

The printer 16 prints the bitmap data from the image processing server 3.

When the printing is failed, the printer 16 notifies the image processing server 3 of failure in printing (S140).

The image processing server 3 supplies the accounting server 4 (accounting program 40; FIG. 4) with accounting information including successful process information or the like (status information) showing that the RIP/color correction process was successful but the print-out process was failed (S240).

The image processing server 3 notifies the client PC 12 of the failure in printing (S144).

Receiving the accounting information, the expense changing portion 410 of the accounting server 4 discounts the temporary fee stored in the accounting DB 412, and sets the discounted fee as a final fee.

The accounting processing portion 414 performs an accounting process to charge the user of the client PC 12 the discounted fee (S280).

Fundamentally, accounting is indeed performed for a RIP process and a print process independently of each other, but those processes are managed as one print job instructed from the client PC 12. Thus, the fee to be charged is not determined unless the instructed print job as a whole is completed.

Here, the accounting information recorded when a print job as a whole has not been terminated but only a RIP process included in the print job has been terminated is not determined. Thus, an accounting process using such undetermined accounting information is not performed.

Here, when a temporary accounting process is performed based on the undetermined accounting information, a final accounting process can be executed only if the undetermined accounting information is determined as soon as the print job is terminated.

Accordingly, a real accounting process is not performed in the temporary accounting process, but the temporary accounting process is left on record. As a result, an accounting process fair to users can be attained, and temporary fees can be recorded and managed.

A third embodiment of the invention will be described below.

First, a second print system 2 will be described.

Figure 14:
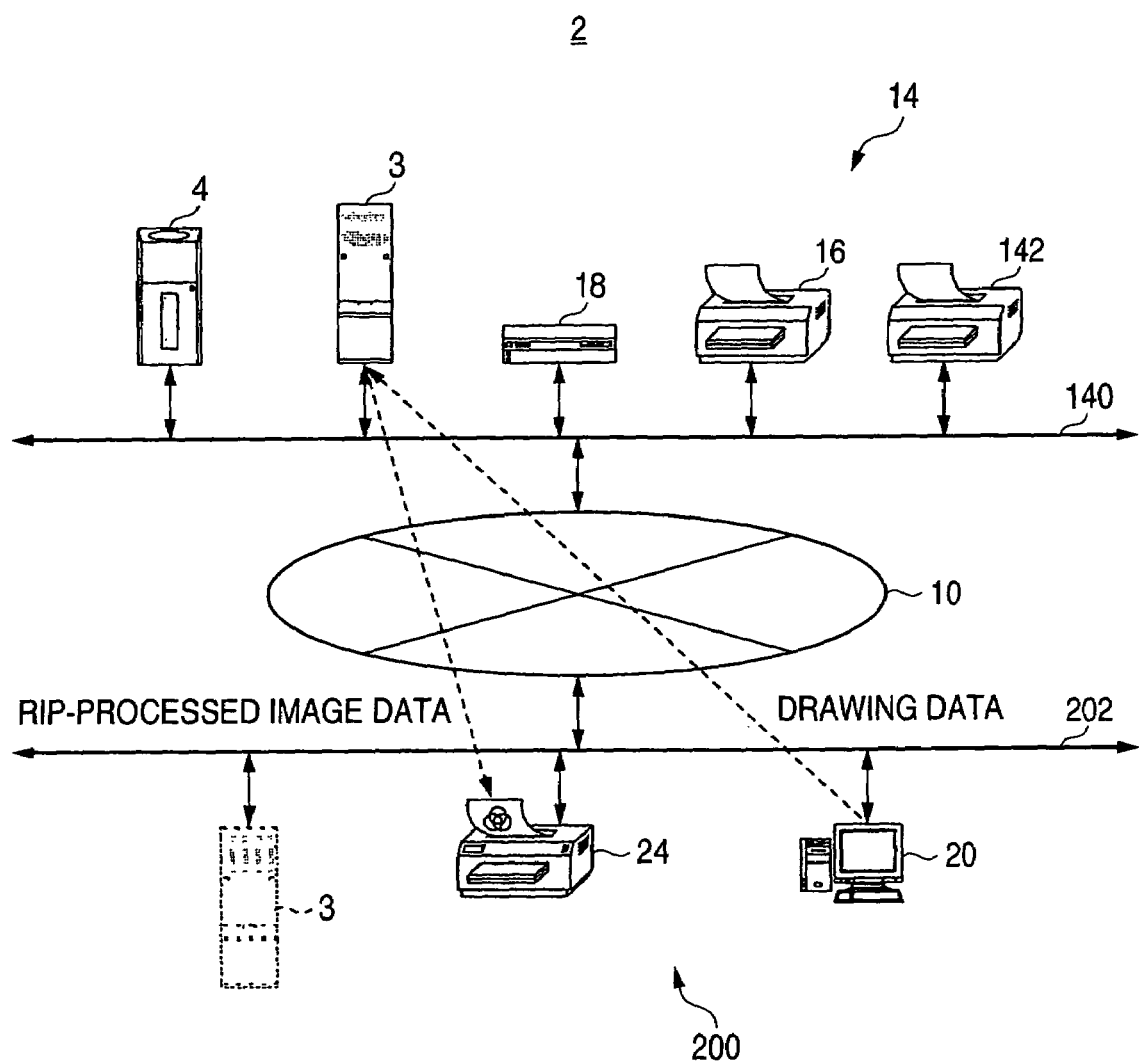
FIG. 14 is a diagram showing the configuration of a second print system to which an image processing method according to the invention is applied, by way of example.

FIG. 14 is a diagram showing the configuration of the second print system 2 to which an image processing method according to the invention is applied, by way of example.

Of the constituent parts shown in FIG. 14, ones substantially the same as the constituent parts shown in FIG. 1 are denoted by the same reference numerals correspondingly.

As shown in FIG. 14, the print system 2 adopts a configuration in which each client PC 12 of the print system 1 shown in FIG. 1 has been replaced by a LAN system 200.

The LAN system 200 is constituted by a client PC 20 similar to the client PC 12, a printer 24 similar to the printer 16, and so on, which are connected through a LAN 202.

As a specific example, assume that in the print system 2, the client PC 20 makes a request to the image processing server 3 for a RIP process and a color correction process, and the printer 24 prints image data obtained as a result of these processes, as shown by the arrows of the broken lines in FIG. 14.

Next, description will be made on the outline of processing of the print system 2 shown as the third embodiment.

Figure 15:
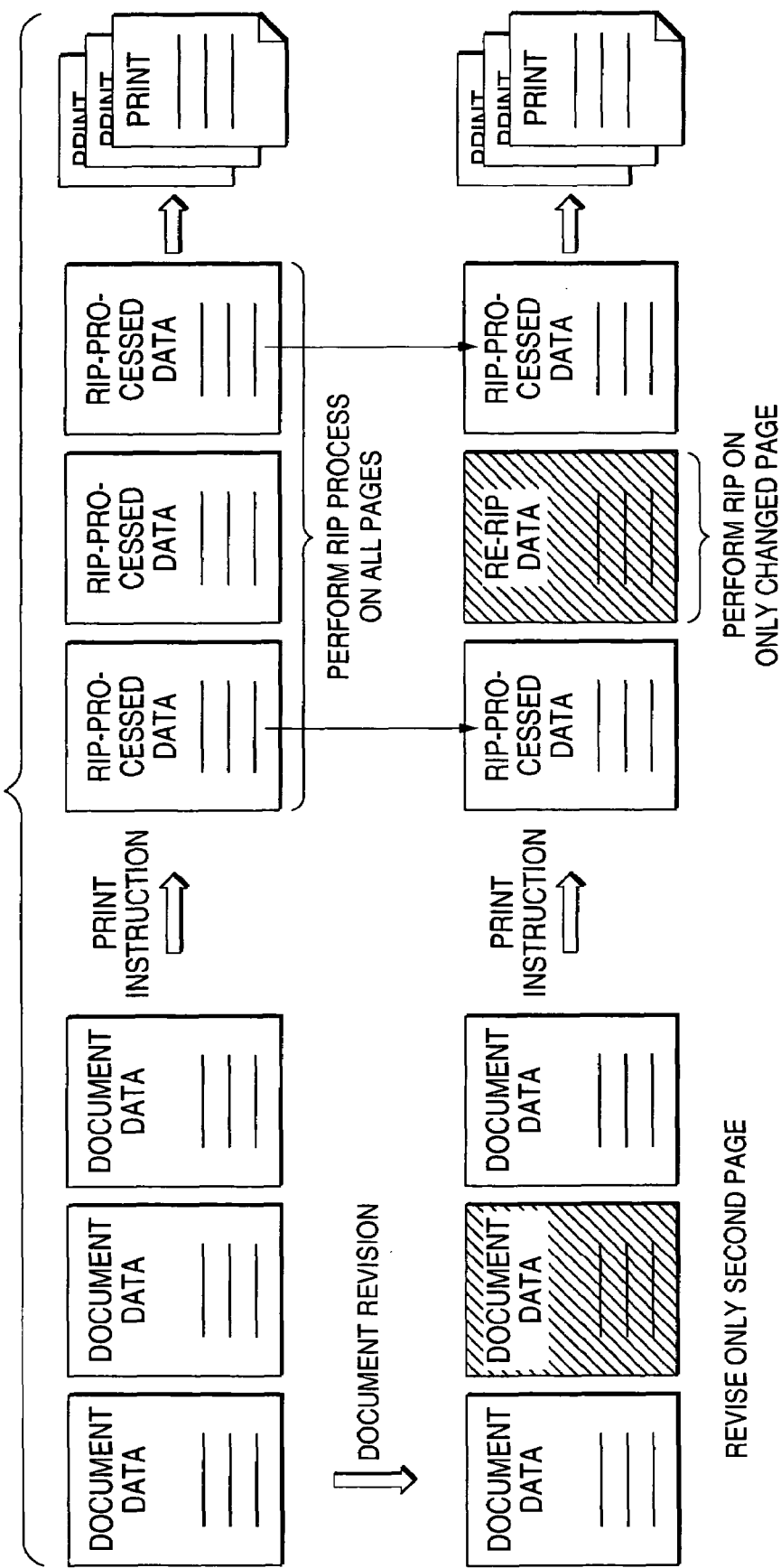
FIG. 15 is a first diagram showing the outline of a RIP process in the print system shown in FIG. 14, by way of example.

FIG. 15 is a first diagram showing the outline of a RIP process in the print system 2 shown in FIG. 14.

As shown in FIG. 15, for example, image data is document data of three pages as shown in the upper left part of FIG. 15. A RIP process and a color correction process are executed upon the document data. The document data is then edited so that the second page of the document data is revised as shown in the lower left part of FIG. 15.

In the following description of this processing, document data is a target of the RIP process by way of example, and the RIP process together with the color correction process will be also referred to simply as a RIP process.

In such an event, when the document data is to be RIP-processed and printed again in no consideration of the revised portion, the RIP process has to be performed on all the three pages of the document data as shown in the upper middle part of FIG. 15.

That is, in this case, the expenses for the RIP process on all the three pages of the document data are generated in spite of partial revision.

On the other hand, when the document data in which only the revised page is subjected to a second-time RIP process is printed in consideration of the revised portion as shown in the lower middle part of FIG. 15, the required expenses can be kept to a minimum.

The third embodiment of the invention which will be described below is devised in consideration of such a point. That is, when image data already subjected to a RIP process, a color correction process and the like is further revised/changed, a second-time RIP process and the like are performed only on the revised/changed portion of the image data. Thus, the expenses required for processing are kept to a minimum.

Figure 16:
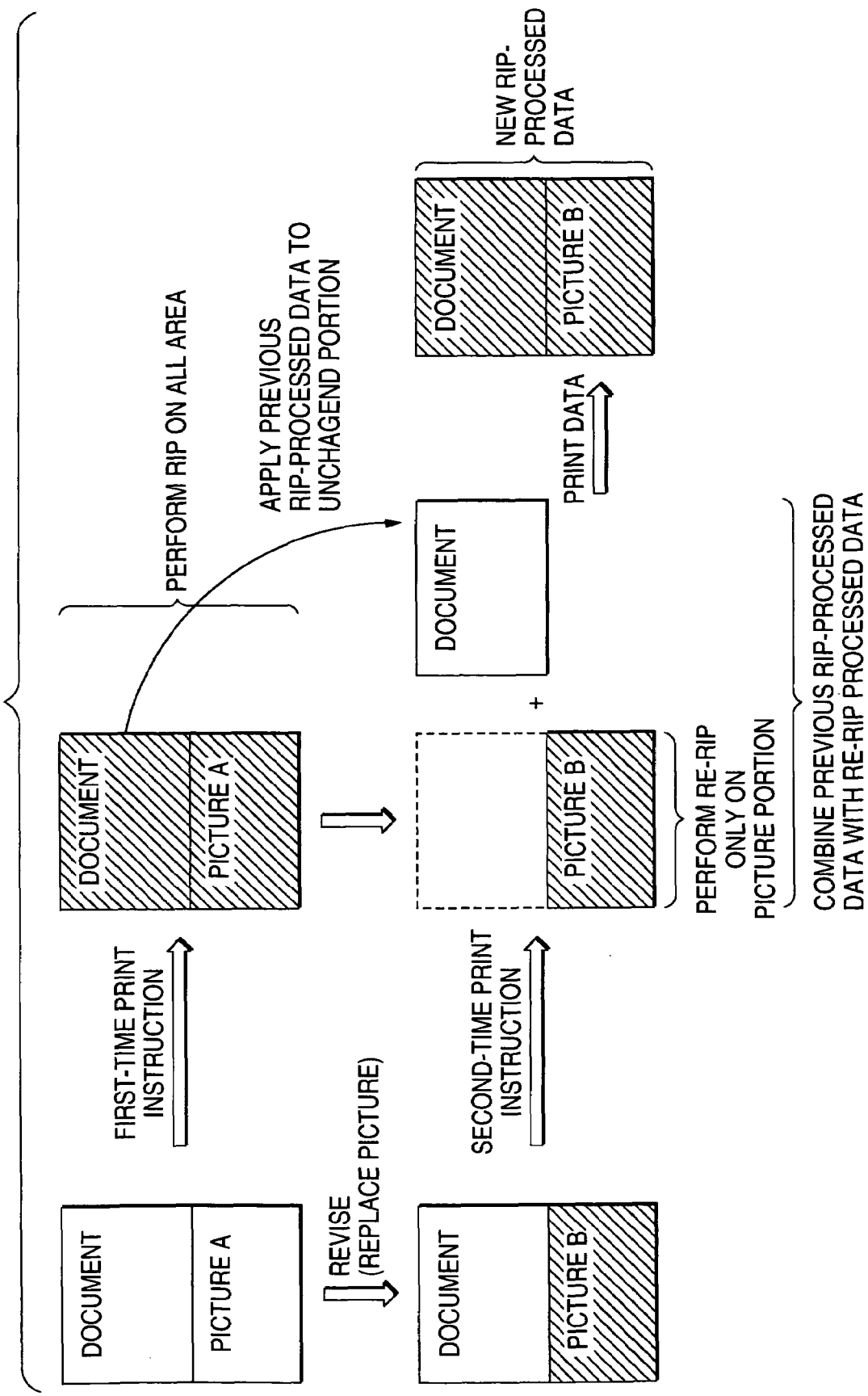
FIG. 16 is a second diagram showing the outline of a RIP process in the print system shown in FIG. 14, by way of example.

FIG. 16 is a second diagram showing the outline of a RIP process in the print system 2 shown in FIG. 14, by way of example.

For example, assume that document data includes a document and a picture A at the beginning and a RIP process is performed on the whole document data when a first-time print instruction is issued, as shown in the upper left and upper middle parts of FIG. 16.

For example, assume that the document in the document data is not changed but only the picture A is replaced by a picture B as shown in the lower left part of FIG. 16 after the first-time RIP process has been performed. In this event, a second-time RIP process (also referred to as "re-RIP process") is not performed on the RIP-processed portion of the document but a RIP process is performed only upon the changed portion of the picture B. Then, image data of the document obtained by the first-time RIP process and image data of the picture B obtained by the second-time RIP process are combined.

When the second-time RIP process is performed only upon a part of the revised document data in such a method, the effect similar to that of a RIP process performed on all the revised document data can be obtained as shown in the right part of FIG. 16. In addition, the time, the machine power and the expenses required for the RIP process can be kept to a minimum.

In this case, the fee for the RIP process upon image data of smaller than one page is, for example, calculated as a fee for the RIP process on image data of 0.5 pages.

Figure 17:
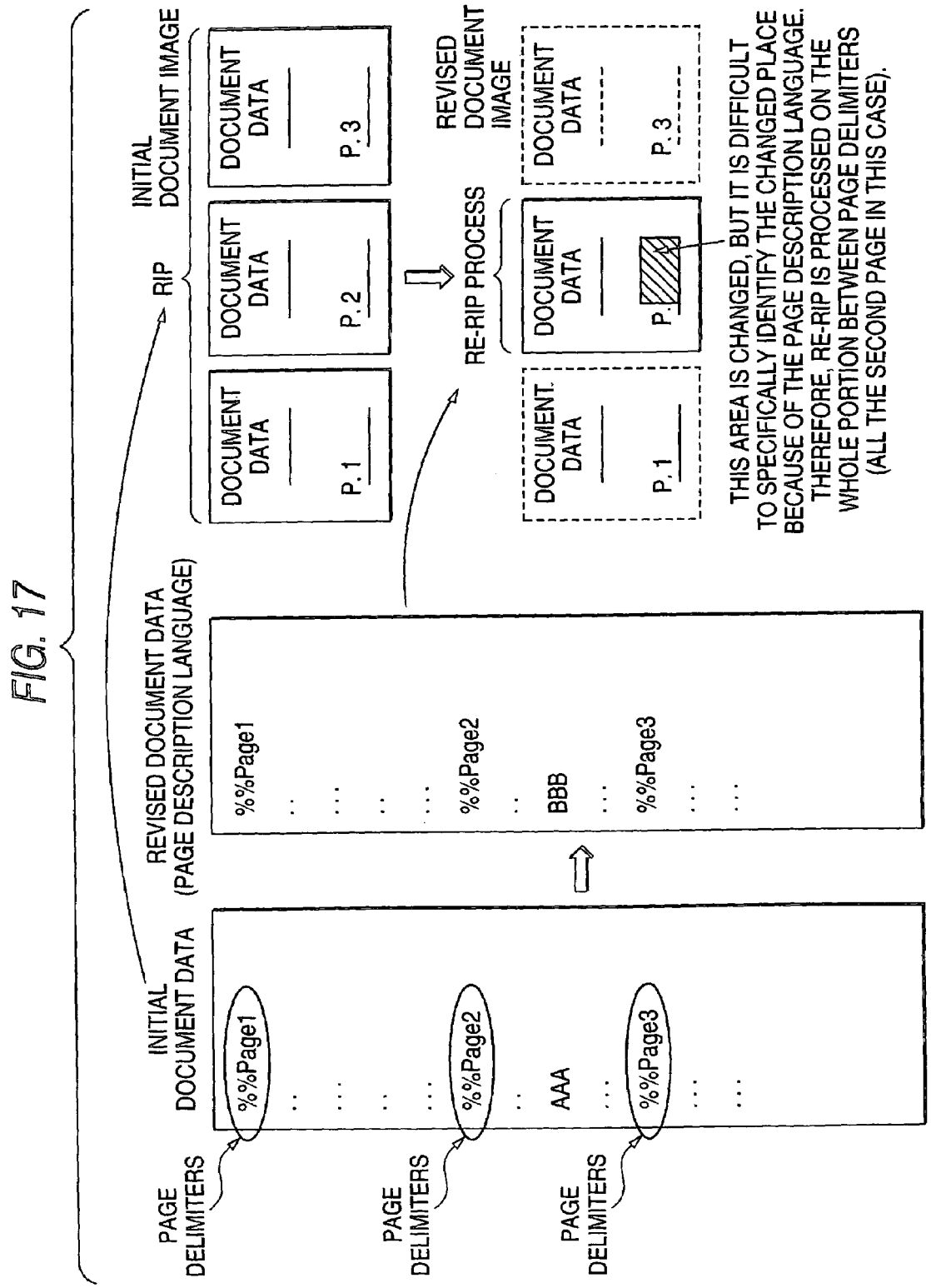
FIG. 17 is a third diagram showing the outline of a RIP process in the print system shown in FIG. 14, by way of example.

FIG. 17 is a third diagram showing the outline of a RIP process in the print system 2 shown in FIG. 14, by way of example.

For example, when image data is document data described in a drawing language, it is difficult to set a portion of one page as a revision/extraction unit as shown in FIG. 16, but it is easy to set one page as a revision/extraction unit.

For example, assume that RIP-processed image data shown in the upper right part of FIG. 17 is obtained by a first-time RIP process, and then the character string "AAA" in the second page of the document data of three pages described in a drawing language is revised to the character string "BBB", as shown in the left half part of FIG. 17.

In this case, for example, as shown in the right half part of FIG. 17, there is a change only in the page number of the second page. However, since the document data as a target of a RIP-process is described in a page drawing language, how the page number will be placed in the image of the second page cannot be determined before the RIP process.

Accordingly, in such a case, revision is detected by page, and a second-time RIP process is performed only upon a page including a revised portion. Thus, it is possible to reduce the time, the expenses, and soon, required for the RIP process.

Figure 18:
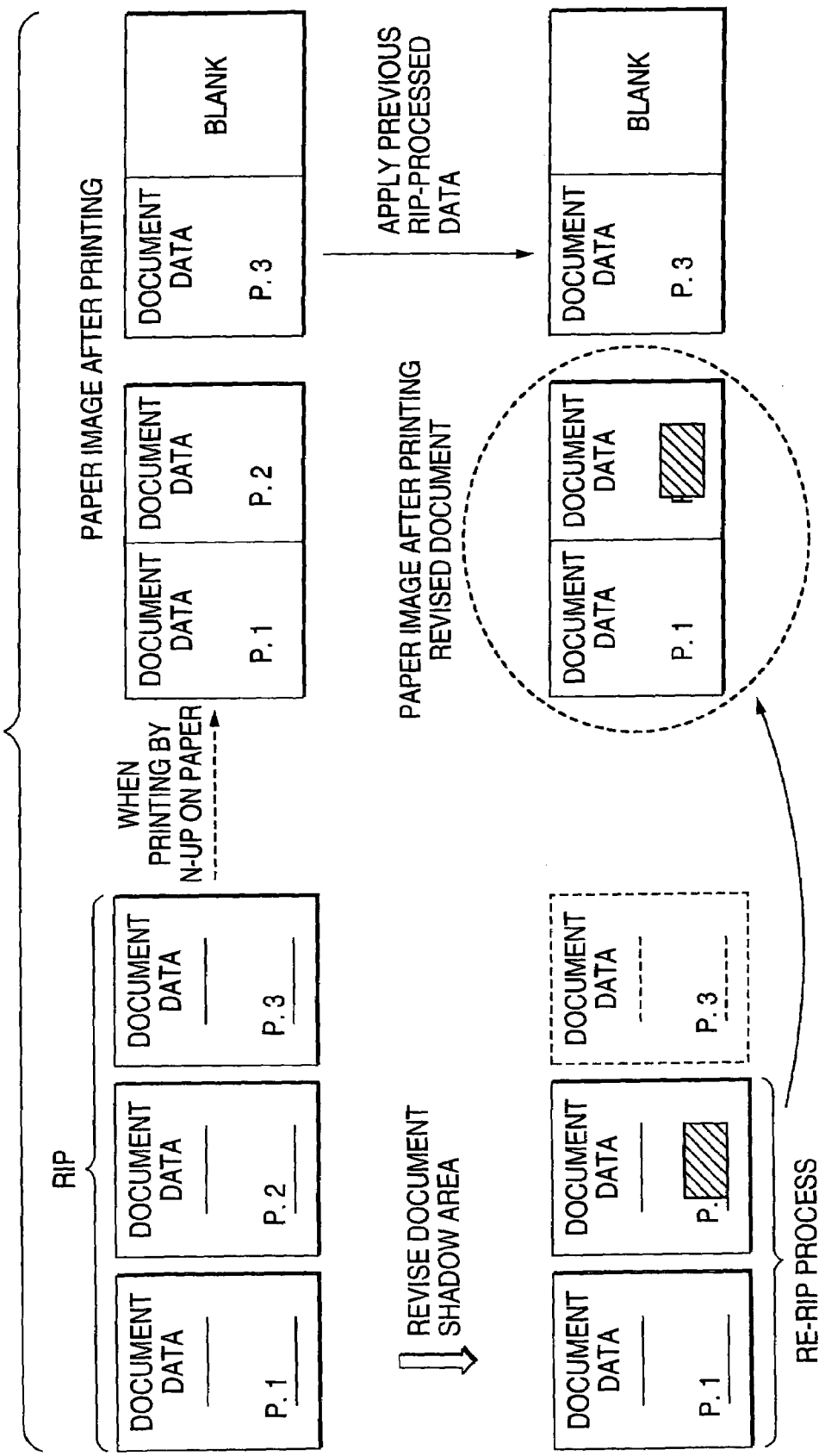
FIG. 18 is a fourth diagram showing the outline of a RIP process in the print system shown in FIG. 14, by way of example.

FIG. 18 is a fourth diagram showing the outline of a RIP process in the print system 2 shown in FIG. 14, by way of example.

Printing N pages of image data on a sheet of paper is also referred to as N-up printing.

For example, when a RIP process for 2-up printing is performed upon document data of three pages shown in the upper left part of FIG. 18, image data as shown in the upper right part of FIG. 18 is obtained.

Consider the case where the portion of the page number of the second page is revised as shown in the lower left part of FIG. 18 after the RIP process for 2-up printing has been executed thus.

In such a case, it is necessary to perform a second-time RIP process upon not only the revised second page of the document data but also the first page of the document data to be printed on the same sheet of paper.

Accordingly, as shown in the lower right part of FIG. 18, when document data obtained by a RIP process for N-up printing is revised, it is necessary to detect the revision not by page but by paper, and perform a second-time RIP process upon the detected sheet of paper.

In such a manner, the document data subjected to the second-time RIP process by paper and to be printed on the first sheet of paper (the first and second pages of the document data) is combined with the RIP-processed third page of the document data in which there has been no revision and change since the first-time RIP process. Thus, it is possible to reduce the time, the expenses and so on required for the RIP process.

FIG. 19 is a fifth diagram showing the outline of a RIP process in the print system 2 shown in FIG. 14, by way of example.

As shown in FIG. 19, for example, assume that revision is performed so that sentences are added to the second page of RIP-processed document data of three pages. In such a case, the number of lines may increase to change not only the layout of the second page but also the layout of the third page.

That is, revision on one portion may give influence to all of the subsequent portions of the document data.

In such a case, as shown in FIG. 19, it is necessary to perform a second-time RIP process on and after the revised page.

[(3-4-2) Second Re-RIP Process on and after Revised Portion]

Figure 20:
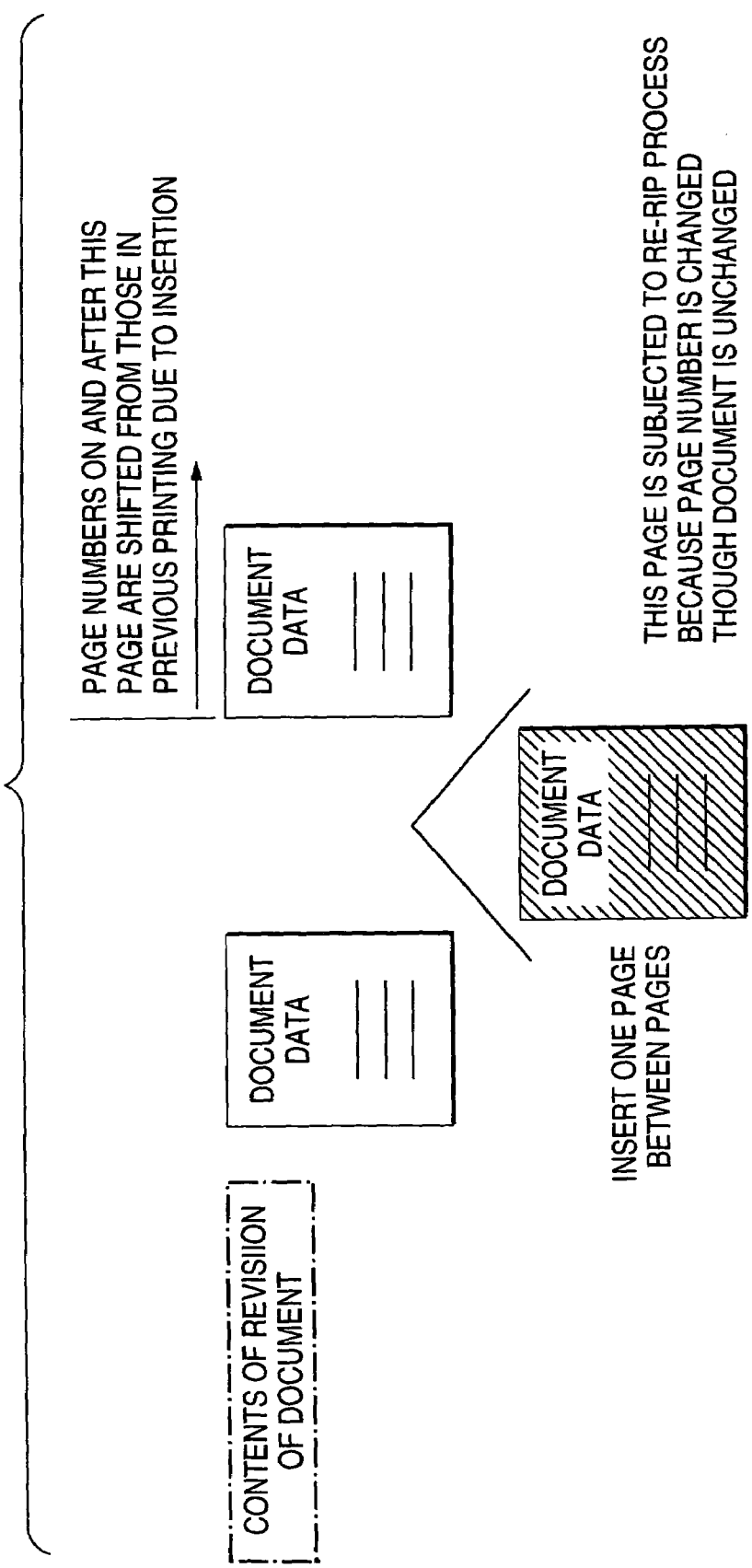
FIG. 20 is a diagram showing a process for inserting a page into document data.

FIG. 20 is a diagram showing a process for inserting a page into document data.

Figure 21:
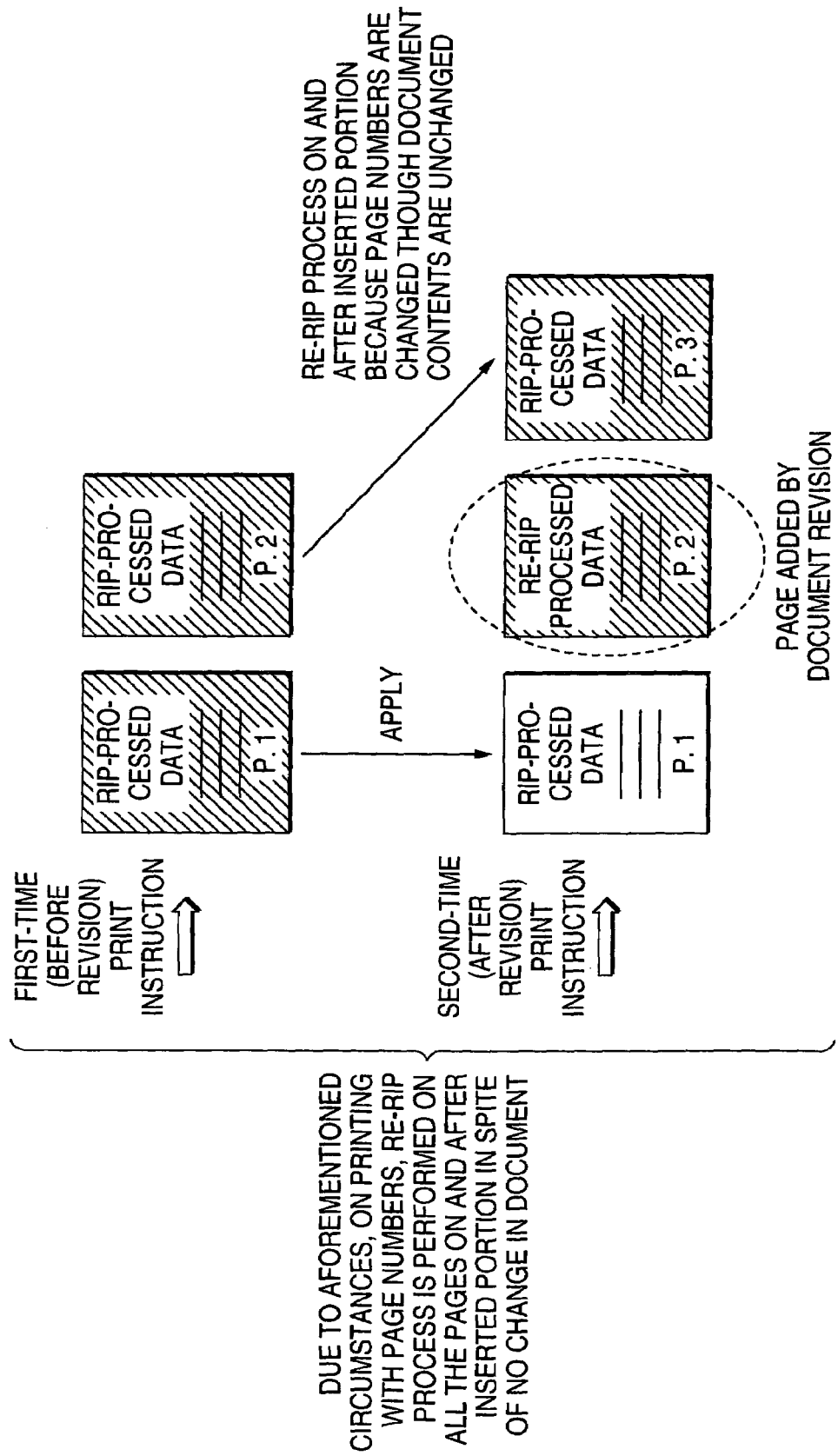
FIG. 21 is a sixth diagram showing the outline of a RIP process in the print system shown in FIG. 14, by way of example.

FIG. 21 is a sixth diagram showing the outline of a RIP process in the print system 2 shown in FIG. 14, by way of example.

For example, as shown in FIG. 20, a new page may be added between two pages of document data subjected to a RIP process.

In such a case, the page number of the page which has been the second page till then is changed from "p. 2" to "p. 3".

Accordingly, when a new page is inserted into document data subjected to a RIP process, a second-time RIP process has to be performed on the new page and the following pages of the document data as shown in FIG. 21.

When there occurs a change only in the page number due to the re-RIP process in such a manner, it is preferable as a service to customers that the expenses for the re-RIP process are made free or discounted.

Description will be made below on a second RIP/color correction program 34 for implementing the re-RIP process which has been described till now.

Figure 22:
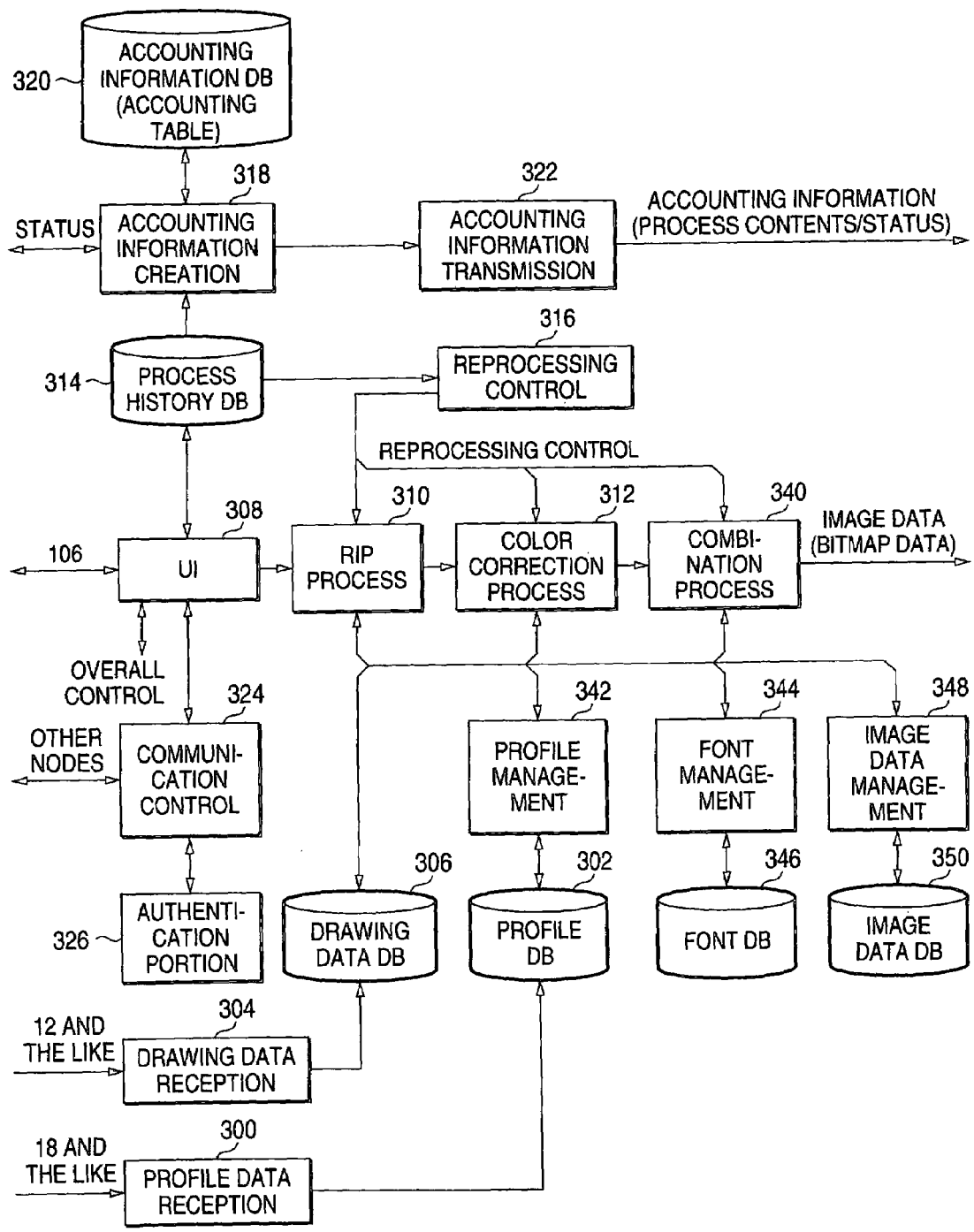
FIG. 22 is a diagram showing the configuration of a second RIP/color correction program operating on the image processing server (FIG. 14) and for executing the re-RIP process shown in FIGS. 15 to 21.

FIG. 22 is a diagram showing the configuration of the second RIP/color correction program 34 operating on the image processing server 3 (FIG. 14) and for executing the re-RIP process shown in FIGS. 15 to 21.

Of the constituent parts of the second RIP/color correction program 34 shown in FIG. 22, ones substantially the same as the constituent parts of the first RIP/color correction program 30 shown in FIG. 3 are denoted by the same reference numerals correspondingly.

In order to make the description clear and concrete, the case where drawing data described in a drawing language is transmitted from the client PC 20 to the image processing server 3 in the print system 2 will be described be low by way of example.

As shown in FIG. 22, the second RIP/color correction program 34 adopts the configuration in which a combination processing portion 340, a profile management portion 342, a font management portion 344, a font database 346, an image data management portion 348 and an image data DB 350 are added to the first RIP/color correction program 30.

The profile management portion 342, the font management portion 344 and the font database 346 which were omitted in the first RIP/color correction program 30 shown in FIG. 3 because they were regarded as included in the RIP processing portion 310 are constituent parts required for a RIP process and a color correction process and actualized in FIG. 22.

In the RIP/color correction program 34, the reprocessing control portion 316 controls a re-RIP process as shown in FIGS. 15 to 21 as well as a process for reusing RIP-processed image data as described above.

The profile DB 302 stores profile data required for a color correction process in the color correction processing portion 312, such as TP data, DLP data, DP data and the like supplied through the network 10 or the recording medium 114 (FIGS. 1 and 2).

The profile management portion 342 manages the profile data stored in the profile DB 302 and provides the profile data suitably for the color correction process in the color correction processing portion 312.

The font DB 346 stores font data supplied through the network 10 or the recording medium 114 (FIGS. 1 and 2) and to be used for an unfolding process and the like of drawing data in the RIP processing portion 310.

The font management portion 344 manages the font data stored in the font DB 346 and provides the font data for the RIP process in the RIP processing portion 310.

The image data DB 350 stores image data subjected to the RIP process by the RIP processing portion 310, image data subjected to the color correction process by the color correction processing portion 312, and image data combined by the combination processing portion 340.

The image data management portion 348 manages the image data stored in the image data DB 350 and provides the image data for an image combining process and the like in the combination processing portion 340.

The combination processing portion 340 combines image data subjected to no re-RIP process with image data subjected to a re-RIP process as shown in FIGS. 15 to 21.

When the re-RIP process or the like is performed by page or by paper, the combination processing portion 340 may control the printer 24 to perform a so-called merge print process for performing a print process upon one piece of image data while performing a print process upon another piece of image data. Thus, it is possible to obtain an effect similar to that in the case where those pieces of image data are combined actually.

Next, description will be made on an image processing program 22 operating on the client PC 20 and for implementing the re-RIP process shown in FIGS. 15 to 21.

Figure 23:
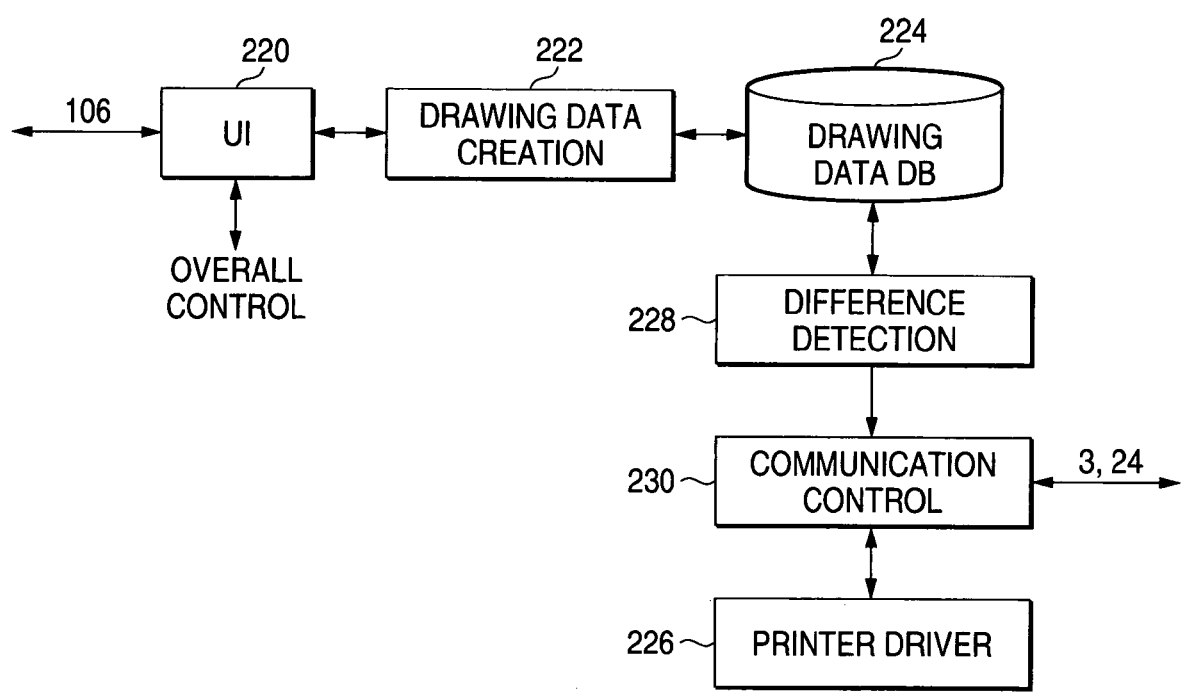
FIG. 23 is a diagram showing the configuration of the second image processing program operating on the client PC (FIG. 14) and for executing the re-RIP process shown in FIGS. 15 to 21.

FIG. 23 is a diagram showing the configuration of the second image processing program 22 operating on the client PC 20 (FIG. 14) and for executing the re-RIP process shown in FIGS. 15 to 21.

As shown in FIG. 23, the image processing program 22 is constituted by a UI portion 220, a drawing data creation portion 222, an image data DB 224, a difference detection portion 228, a communication control portion 230 and a printer driver portion 226.

The image processing program 22 uses these constituent parts to create drawing data, request the image processing server 3 to perform a RIP process, a color correction process and the like on the created drawing data, and supply the drawing data to the image processing server 3.

In addition, when drawing data for which the image processing program 22 has once made a request to the image processing server 3 for a RIP process, a color correction process, a print process and the like is revised thereafter, the image processing program 22 detects a revised portion added to the drawing data, and makes a request to the image processing server 3 (RIP/color correction program 34; FIG. 22) for a re-RIP process and the like.

In addition, the UI portion 220 accepts the operation of the user on the input/display unit 106 (FIG. 2) or the like, and controls actions of the constituent parts of the image processing program 22 in accordance with the accepted operation.

The drawing data creation portion 222 describes the drawing data in a page drawing language in accordance with the user's operation supplied through the UI portion 220, and stores the described drawing data into the image data DB 224.

The difference detection portion 228 detects a difference of revision or the like on the drawing data under the control of the UI portion 220.

When the difference detection portion 228 detects the difference, the difference detection portion 228 makes a request to the image processing server 3 for a re-RIP process and the like taking into consideration the difference occurring in the drawing data, as shown in FIGS. 15 to 21.

The communication control portion 230 implements a communication sequence (not shown) with other nodes in the same manner as the communication control portion 324 of the RIP/color correction program 34.

For image data (drawing data) not requiring any RIP process or any color correction process, the printer driver portion 226 controls the printer 24 to print the image data (drawing data).

The printer driver portion 226 makes the server perform data processing on image data (drawing data) requiring a RIP process or a color correction process. Thus, in this event, the printer driver portion does not operate.

Next, description will be made on an image processing program 26 operating on the printer 24 and for implementing the re-RIP process shown in FIGS. 15 to 21.

Figure 24:
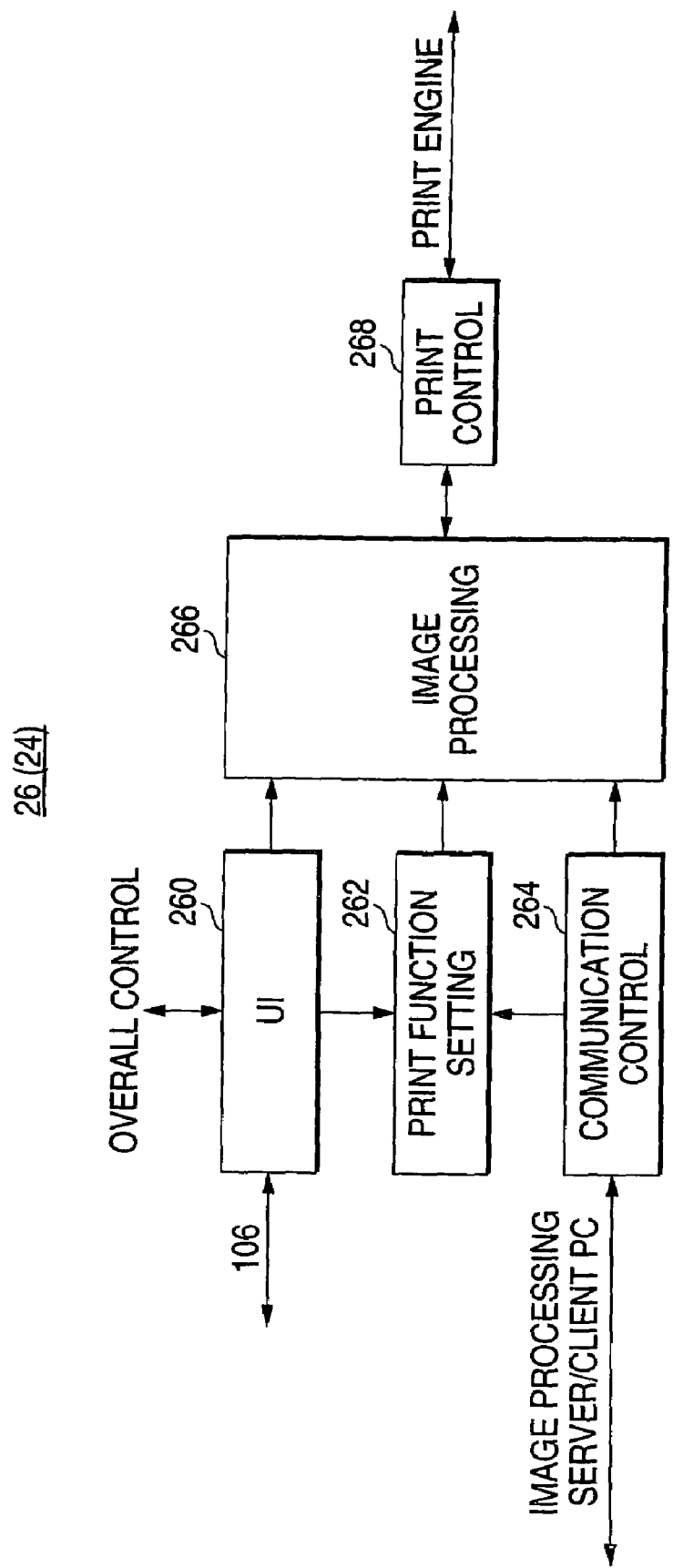
FIG. 24 is a diagram showing the configuration of the second image processing program operating on the printer (FIG. 14) and for executing the re-RIP process shown in FIGS. 15 to 21.

FIG. 24 is a diagram showing the configuration of the second image processing program 26 operating on the printer 24 (FIG. 14) and for executing the re-RIP process shown in FIGS. 15 to 21.

As shown in FIG. 24, the image processing program 26 is constituted by a UI portion 260, a print function setting portion 262, a communication control portion 264, an image processing portion 266 and a print control portion 268.

In the image processing program 26, the UI portion 260 accepts the operation of the user on the input/display unit 106 or the like, and controls actions of the constituent parts of the image processing program 26 in accordance with the accepted operation.

The print function setting portion 262 sets a print function in the printer 24 in accordance with the user's operation supplied through the UI portion 260.

The communication control portion 264 controls communications with other nodes so as to implement a communication sequence (not shown).

The image processing portion 266 unfolds image data supplied from the communication control portion 264 or the like, in accordance with the setting of the print function setting portion 262, so as to obtain bitmap data. The image processing portion 266 supplies the bitmap data to the print control portion 268.

The print control portion 268 controls the print engine (function implementation portion 108; FIG. 2) of the printer 24 so as to perform a print process on the bitmap data made up by the image processing portion 266.

The operation of the print system 2 will be described below.

Figure 25:
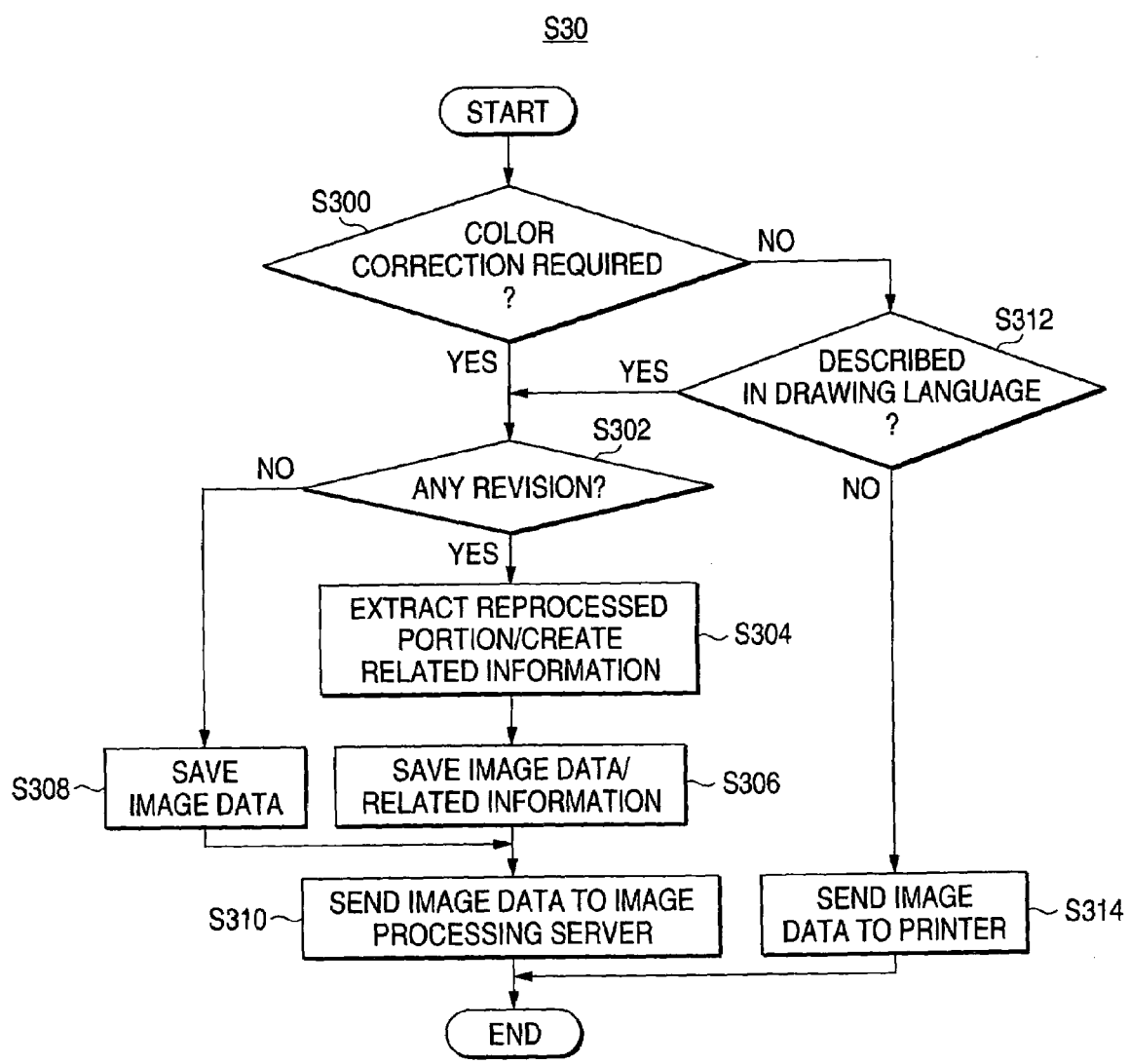
FIG. 25 is a flow chart showing a process (S30) on the client PC (image processing program) side in the print system (FIG. 14)

FIG. 25 is a flow chart showing a process (S30) on the client PC 20 (image processing program 22) side in the print system 2 (FIG. 14).

Figure 26:
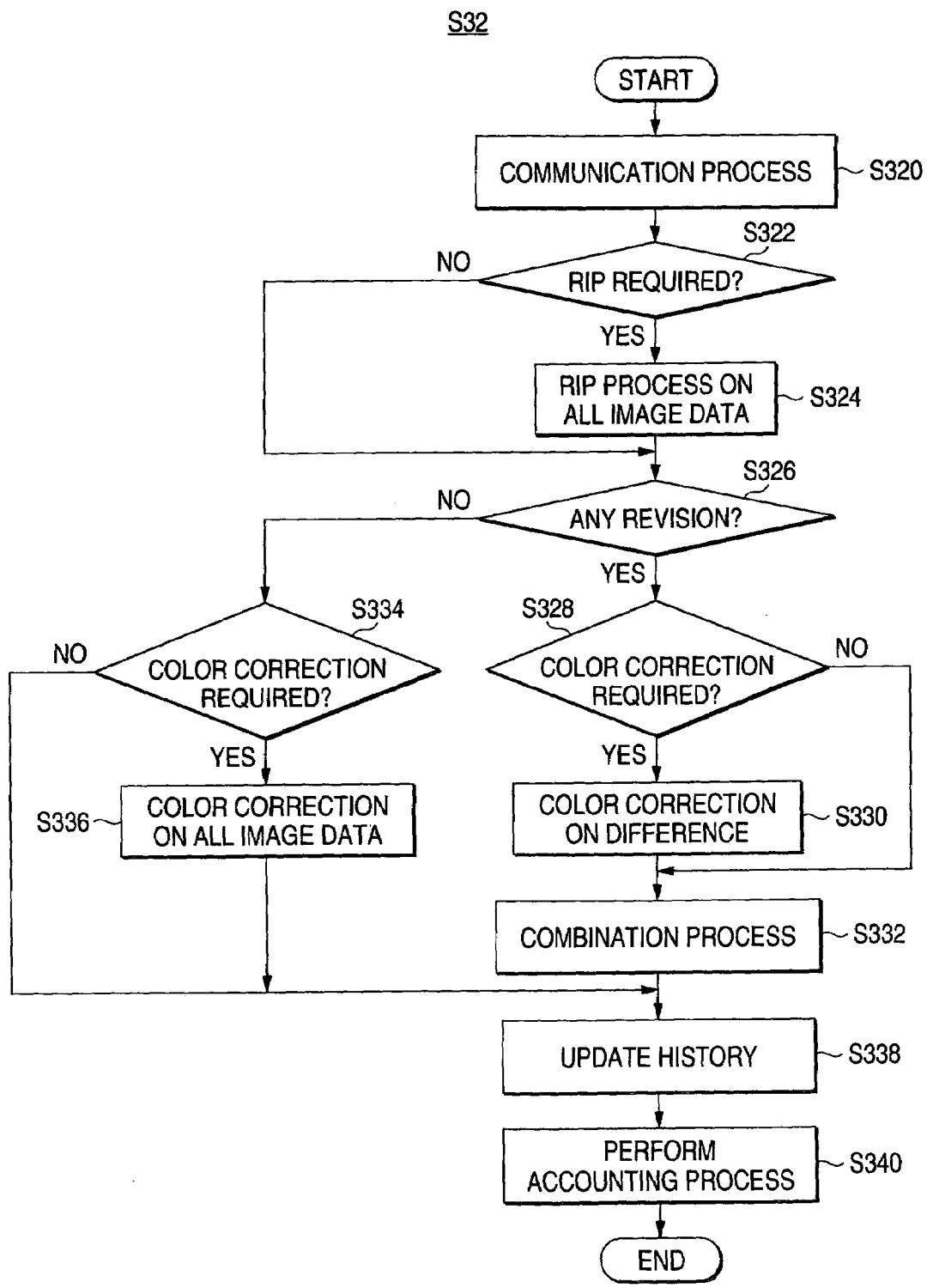
FIG. 26 is a flow chart showing a first-time process (S32) on the image processing server (RIP/color correction program 34) side in the print system (FIG. 14)

FIG. 26 is a flow chart showing a first-time process (S32) on the image processing server 3 (RIP/color correction program 34) side in the print system 2 (FIG. 14).

First, description will be made on the case where a partial RIP process is not performed.

As shown in FIG. 25, in Step 300 (S300), the UI portion 220 judges whether image data (drawing data) to be printed by the printer 24 requires a color correction process or not.

The image processing program 22 advances to the processing of S302 when a color correction process is required. Otherwise the image processing program 22 jumps to the processing of Step 312 (S312).

Further when it is concluded in the processing of S312 that a server-side process on the image data (drawing data) is not required, the printer driver 226 shown in FIG. 23 is activated, and the image data (drawing data) is sent to the printer 24.

Otherwise, a process on the image data is executed in the processing of S302.

In Step 302 (S302), the difference detection portion 228 judges whether the image data (drawing data) judged in the processing of S300 has been revised or not since the last RIP process.

When there is no revision, the image processing program 22 concludes that the image data (drawing data) is set as a target of a RIP process for the first time or the image data (drawing data) has not been revised/changed since the last RIP process. Then, the image processing program 22 jumps to the processing of S308. Otherwise the image processing program 22 advances to the processing of S304.

The image processing program 22 extracts a changed portion (portion to be reprocessed) relative to the last image data (drawing data) that has been stored. In the processing of S306, information indicating the changed portion is added to the last image data (drawing data). Then, the image processing program 22 advances to the processing of S310.

When the whole of new drawing data is not saved but only a difference from the last drawing data is added thereto in such a manner, it is possible to save the storage area of a hard disk or the like.

In the processing of S310, the image processing program 22 sends the whole of the drawing data to the image processing server 3 shown in FIG. 14.

Further, when there is difference information from the last drawing data, the image processing program 22 sends the difference information together to the image processing server 3.

In the latter case, the difference information is analyzed by the server 3.

If not only the extraction of a difference but also the analysis thereof are executed in the client PC 20, the traffic of the LAN 202 will be reduced. It is generally, however, preferable that the process of analysis for judging where the influence of the difference will reach is performed by the image processing server 3.

The first reason is that it is natural to perform the analysis process in the server because the function of interpreting a page description language is present only in the server in the example of the system.

The second reason is that the load of the analysis process is so large that it is advantageous from the point of view of throughput to perform the process not in the client PC 20 but in the server having higher throughput.

In Step 304 (S304), the difference detection portion 228 extracts a portion of the image data (drawing data) requiring a re-RIP process, a color correction process and the like in the image processing server 3.

Such a portion of the image data (drawing data) is affected by change/revision of the image data (drawing data) based on the difference information sent from the client PC 20 together with the image data (drawing data).

Further, the difference detection portion 228 creates related information indicating an ID (image ID) of the image data (drawing data), a portion where revision has been detected, and profile data required for a re-RIP process and the like.

In Step 306 (S306), the difference detection portion 228 adds the related information to the image data (drawing data) and stores them into the image data DB 224 as image data (drawing data) to be sent to the image processing server 3.

In Step 308 (S308), the difference detection portion 228 stores the image data (drawing data) where no revision has been detected, into the image data DB 224 as image data (drawing data) to be sent to the image processing server 3.

In Step 310 (S310), the communication control portion 230 reads the image data from the image data DB 224 through the difference detection portion 228, and sends the image data to the image processing server 3.

In Step 312 (S312), the difference detection portion 228 judges whether the image data (drawing data) judged in the processing of S300 is drawing data described in a drawing language or not.

The image processing program 22 returns to the processing of S302 when the image data is drawing data. Otherwise the image processing program 22 concludes that a RIP process and the like are required, and advances to the processing of S314.

In Step 314 (S314), the communication control portion 230 supplies the image data to the printer 24.

On the other hand, on the image processing server 3 side, as shown in FIG. 26, in Step 320 (S320), the communication control portion 324 performs a communication process to receive the image data (drawing data) from the image processing program 22.

In Step 322 (S322), the UI portion 308 judges whether the received image data (drawing data) requires a RIP process or not.

The RIP/color correction program 34 advances to the processing of S324 when the received image data is drawing data requiring a RIP process. Otherwise the RIP/color correction program 34 skips to the processing of S326.

In Step 324 (S324), the RIP processing portion 310 performs a RIP process on all the drawing data so as to obtain image data.

In Step 326 (S326), the reprocessing control portion 316 judges whether there is revision in the image data or not.

The RIP/color correction program 34 advances to the processing of S328 when there is revision in the image data. Otherwise the RIP/color correction program 34 jumps to the processing of S334.

In Step 328 (S328), the reprocessing control portion 316 judges whether a color correction process on the image data is required or not.

The RIP/color correction program 34 advances to the process of S330 when a color correction process is required. Otherwise the RIP/color correction program 34 skips to the process of S332.

In Step 330 (S330), the color correction processing portion 312 performs a color correction process upon a revised/changed portion (difference) in the image data.

In Step 332 (S332), the combination processing portion 340 reads a portion that has not been revised/changed from the color-corrected image data stored in the image data DB 350, and combines the read portion with the difference subjected to the color correction process in the processing of S330.

In Step 334 (S334), the reprocessing control portion 316 judges whether a color correction process on the image data is required or not.

The RIP/color correction program 34 skips to the processing of S336 when a color correction process is required. Otherwise the RIP/color correction program 34 advances to the processing of S338.

In Step 336 (S336), the color correction processing portion 312 performs a color correction process on all the image data.

In Step 338 (S338), the reprocessing control portion 316 stores the aforementioned process into the process history DB so as to update the process log.

In Step 340 (S340), the image processing server 3 transmits accounting information to the accounting server 4 with reference to the updated process log.

The accounting server 4 performs an accounting process upon the client PC 20 in accordance with the accounting information from the image processing server 3.

On this occasion, accounting for the use of profile data and font data is performed together with the accounting for the image processing in accordance with setting.

Next, description will be made on the case where a partial RIP process is performed.

Figure 27:
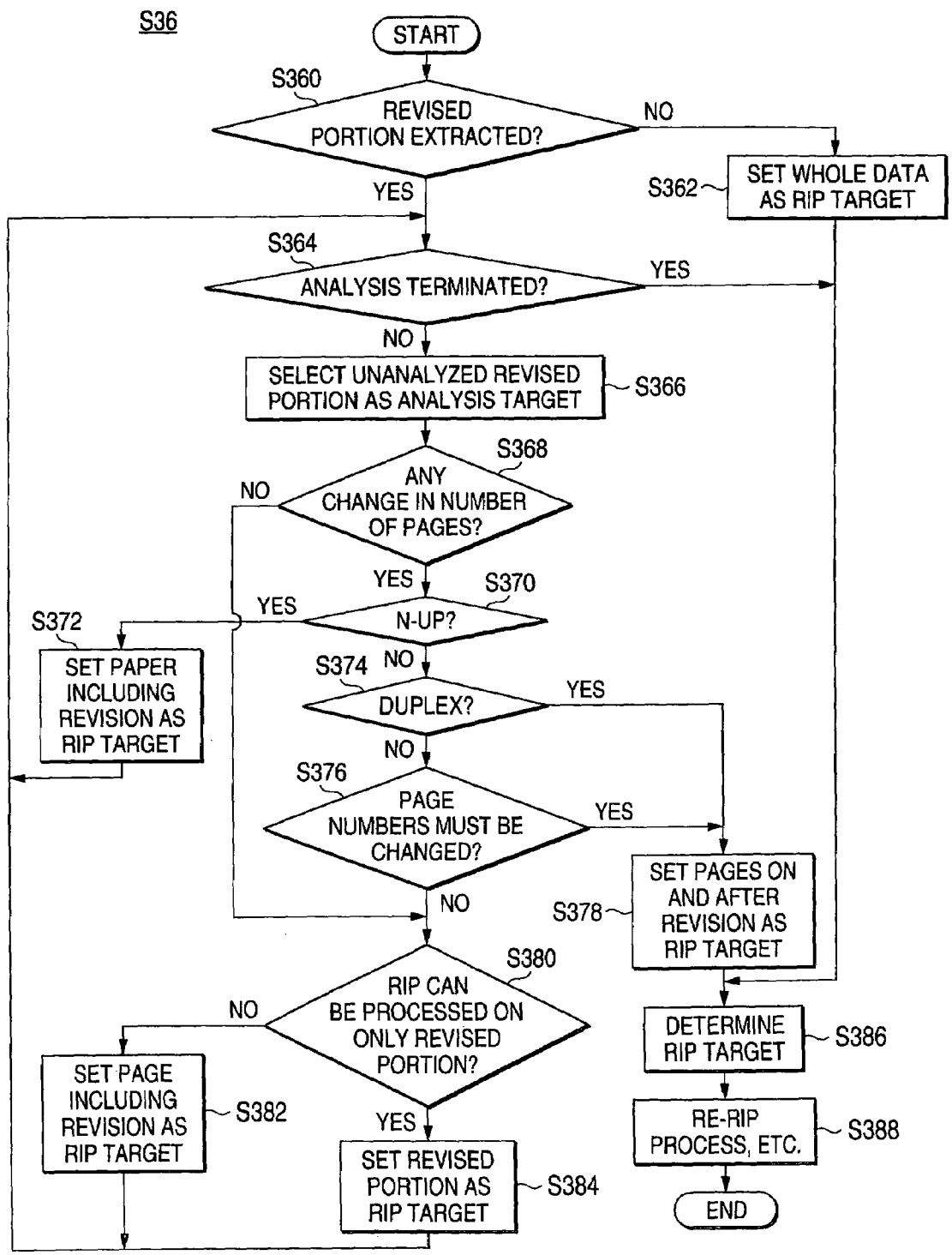
FIG. 27 is a flowchart showing a second-time or subsequent process (partial RIP process; S36) on the image processing server (RIP/color correction program 34) side when a partial RIP process is performed in the print system (FIG. 14)

FIG. 27 is a flowchart showing a second-time or subsequent process (partial RIP process; S36) on the image processing server 3 (RIP/color correction program 34) side when a partial RIP process is performed in the print system 2 (FIG. 14).

Of the steps shown in FIG. 26, ones for a RIP process are replaced by ones for a re-RIP process in FIG. 27.

In FIG. 27, steps other than ones for the re-RIP process are omitted, but those steps are similar to the steps shown in FIG. 26 respectively.

As shown in FIG. 27, in Step 360 (S360), the reprocessing control portion 316 extracts a portion to be revised from the image data (drawing data) sent from the client PC 20.

The RIP/color correction program 34 skips to the processing of S364 when a portion to be revised can be extracted from the image data (drawing data). Otherwise the RIP/color correction program 34 advances to the processing of S362.

In this example, the reprocessing control portion 316 detects a revised portion based on related information added to the image data (drawing data) on the client PC 20 side. However, the reprocessing control portion 316 may extract the revised portion as follows. That is, image data (drawing data) having the same image ID as that of image data (drawing data) received newly is read from the image data DB 350. The new image data (drawing data) is compared with the image data (drawing data) read from the image data DB 350.

To extract the revised portion, for example, processing known as diff in UNIX® is applicable. Alternatively, a method based on comparison in number of pages or version between these pieces of image data (drawing data) may be used.

In Step 362 (S362), the reprocessing control portion 316 sets the whole of the image data (drawing data) as a target of a re-RIP process and the like.

In Step 364 (S364), the reprocessing control portion 316 judges whether analysis of all the image data (drawing data) has been finished or not.

The RIP/color correction program 34 jumps to the processing of S386 when analysis of all the image data (drawing data) has been finished. Otherwise the RIP/color correction program 34 advances to the processing of S366.

In Step 366 (S366), the reprocessing control portion 316 selects a revised portion that has not yet been analyzed, as a target of analysis.

In Step 368 (S368), the reprocessing control portion 316 judges whether there is a change in the number of pages of the image data (drawing data) or not.

The RIP/color correction program 34 advances to the processing of S370 when there is a change in the number of pages. Otherwise the RIP/color correction program 34 jumps to the processing of S380.

In Step 370 (S370), the reprocessing control portion 316 judges whether the image data (drawing data) should be printed by N-up or not.

The RIP/color correction program 34 skips to the processing of S374 when the image data (drawing data) should be printed by N-up (See FIG. 18). Otherwise the RIP/color correction program 34 advances to the processing of S372.

In Step 372 (S372), the reprocessing control portion 316 sets sheets of paper including the revised portion as a target of a re-RIP process and the like.

In Step 374 (S374), the reprocessing control portion 316 judges whether the image data (drawing data) should be printed by duplex or not.

The number of pages should be changed when the image data (drawing data) is printed by duplex. Thus, the RIP/color correction program 34 skips to the processing of S378. Otherwise the RIP/color correction program 34 advances to the processing of S376.

In Step 376 (S376), the reprocessing control portion 316 judges whether the image data (drawing data) includes page numbers to be changed or not.

The RIP/color correction program 34 advances to the processing of S378 when the page numbers should be changed (see FIGS. 19 and 21). Otherwise the RIP/color correction program 34 skips to the processing of S380.

In Step 378 (S378), the reprocessing control portion 316 sets all the image data (drawing data) on and after the page including the revised portion, as a target of a re-RIP process and the like.

In Step 380 (S380), the reprocessing control portion 316 judges whether a RIP process only on the revised portion can be performed or not.

The RIP/color correction program 34 skips to the processing of S384 when the RIP process only on the revised portion can be performed (see FIG. 16). Otherwise (see FIGS. 15 and 17) the RIP/color correction program 34 advances to the processing of S382.

In Step 382 (S382), the reprocessing control portion 316 sets pages including the revised portion as a target of a re-RIP process.

In Step 384 (S384), the reprocessing control portion 316 sets the revised portion as a target of a re-RIP process.

In Step 386 (S386), the reprocessing control portion 316 determines the portion set as a target of a re-RIP process and the like in the processing of S362, S372, S378, S382 or S384, to be a target of a re-RIP process and the like.

In Step 388 (S388), the RIP processing portion 310 performs a RIP process on the portion of the image data (drawing data) set as a target of a re-RIP process and the like. Further, the color correction processing portion 312 and the like perform the steps on and after S326 shown in FIG. 26, so as to perform a color correction process and the like on the image data obtained as a result of the re-RIP process in accordance with necessity.

When the aforementioned processing is performed upon all the revised portions, the image processing server 3 controls the printer 24 to print the image data.

That is, the image data stored in the drawing data DB 306 and the reprocessed image data are combined by the combination processing portion 340, and the combined image data is once stored into the drawing data DB 306.

The combined image data stored thus is read from the drawing data DB 306 again and supplied to the printer 24.

Storing and reading the image data thus will be required if the throughput in reprocessing or combining processing does not reach the throughput required by the printer 24.

On the other hand, when the quantity of the revised portions is small, the throughput in reprocessing or combining processing is higher than the throughput required by the printer 24. Thus, the reprocessing control portion 316 combines the revised data with the original image data while supplying the combined image data directly to the printer 24.

Even in this case, the combined image data is saved into the drawing data DB 306 for the subsequent processing.

The processing shown in FIG. 27 is applicable not only to a RIP process but also to other processes such as a color correction process.

Although the case where the processing shown in FIG. 27 is executed on the image processing server 3 side has been shown by way of example, the processing for determining a target of a re-RIP process and the like may be executed in the client PC 20.

As an accounting method for a re-RIP process and the like, various methods can be considered, for example, including a method for doing accounting for increase in the number of pages caused by the re-RIP process if any, a method for doing accounting for all the pages as a target of the re-RIP process, and a method for doing accounting for the area of an image.

When a re-RIP process is performed within a predetermined period after a first-time RIP process and the like, the fee for the re-RIP process and the like may be discounted or made free.

Although the case where image data is printed is shown by way of example, a re-RIP process and the like according to the invention is applicable to another image processing such as image processing for display on the input/display unit 106 (FIG. 2) of the client PC 20.

Although the embodiment has been described on the case where the processing for detecting a difference and the processing for combination are performed on the server side when there is revision, the site where these functions are implemented is not limited to the server. For example, a client PC equipped with these functions may make a printer perform a print process directly.

A fourth embodiment of the invention will be described below.

First, the outline of the fourth embodiment will be described.

For example, a printing machine capable of printing up to a certain resolution cannot normally print an image whose resolution is higher than the resolution the printing machine can attain.

For example, when an image including a thin line (hair line) drawn beyond the resolution the printing machine can attain is printed by the printing machine, the hair line is not printed normally.

In addition, when an RGB image is mixed in a layout image, the portion corresponding to the RGB image may be printed as a black (K) image.

Similarly, when an image compressed in an EPS-JPEG system or the like is printed by a printing machine, the portion corresponding to the EPS-JPEG compressed image may be printed as a black (K) image.

Further, some images or documents (hereinafter also referred to as objects) included in image data may be printed (overprinted) over other objects.

The fourth embodiment of the invention is devised to examine image data before a RIP process so as to detect, from the image data, a portion (printing in compatible portion) where there may occur such a problem when the portion is printed. In this event, accounting can be done for the detection process itself independently of the RIP process.

In addition, the fourth embodiment of the invention is devised to perform a RIP process and a print process separately upon such a printing incompatible portion and a printing compatible portion which can be printed normally.

That is, according to the fourth embodiment of the invention, for example, when a printing incompatible portion which has been revised to be compatible with printing is printed or when a printing incompatible portion is forcibly printed as it is, a RIP process is performed upon such a printing incompatible portion, and the printing incompatible portion is combined with a printing compatible portion subjected to a RIP process so that a print process can be performed upon those combined portions.

With such an arrangement, a problem on a manuscript can be detected before printing, and accounting can be done for this detection separately from a RIP process and the like. Thus, an accounting process flexible and detailed for users can be attained.

Figure 28:
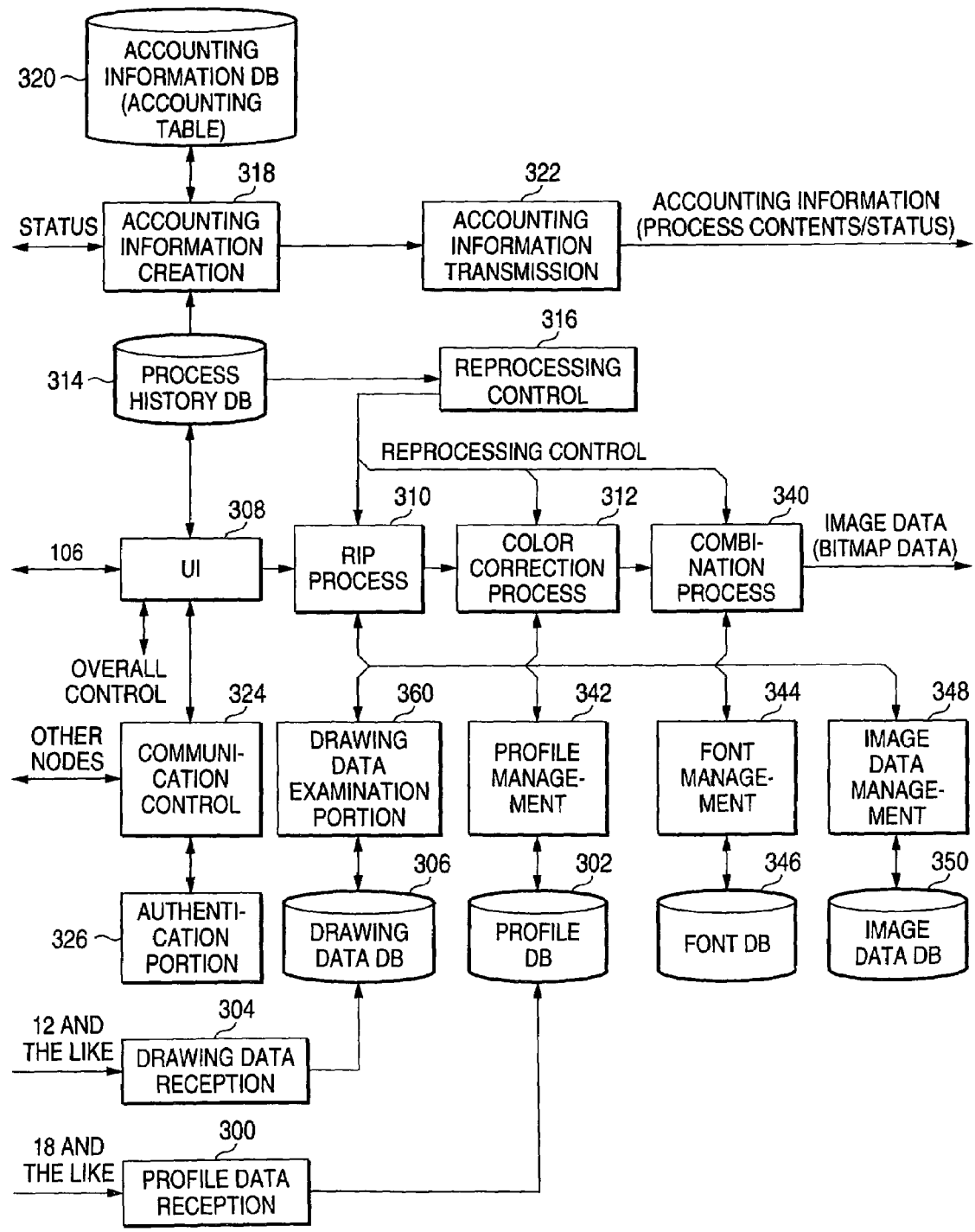
FIG. 28 is a diagram showing the configuration of a third RIP/color correction program operating on the image processing server (FIG. 14) in the second print system and for examining image data and performing a RIP process on the image data.

FIG. 28 is a diagram showing the configuration of a third RIP/color correction program 36 operating on the image processing server 3 (FIG. 14) in the second print system 2 and for examining image data and performing a RIP process on the image data.

Of the constituent parts of the RIP/color correction program 36 shown in FIG. 28, ones substantially the same as the constituent parts of the first and second RIP/color correction programs 30 and 34 shown in FIGS. 4 and 22 are denoted by the same reference numerals correspondingly.

As shown in FIG. 28, the third RIP/color correction program 36 adopts a configuration in which a drawing data examination portion 360 is added to the second RIP/color correction program 34 shown in FIG. 22.

In the RIP/color correction program 36, drawing data stored in the drawing data DB 304 is examined, and a portion/object (printing incompatible portion) incompatible with printing as described above is detected when the printing incompatible portion is included in the drawing data.

Figure 29:
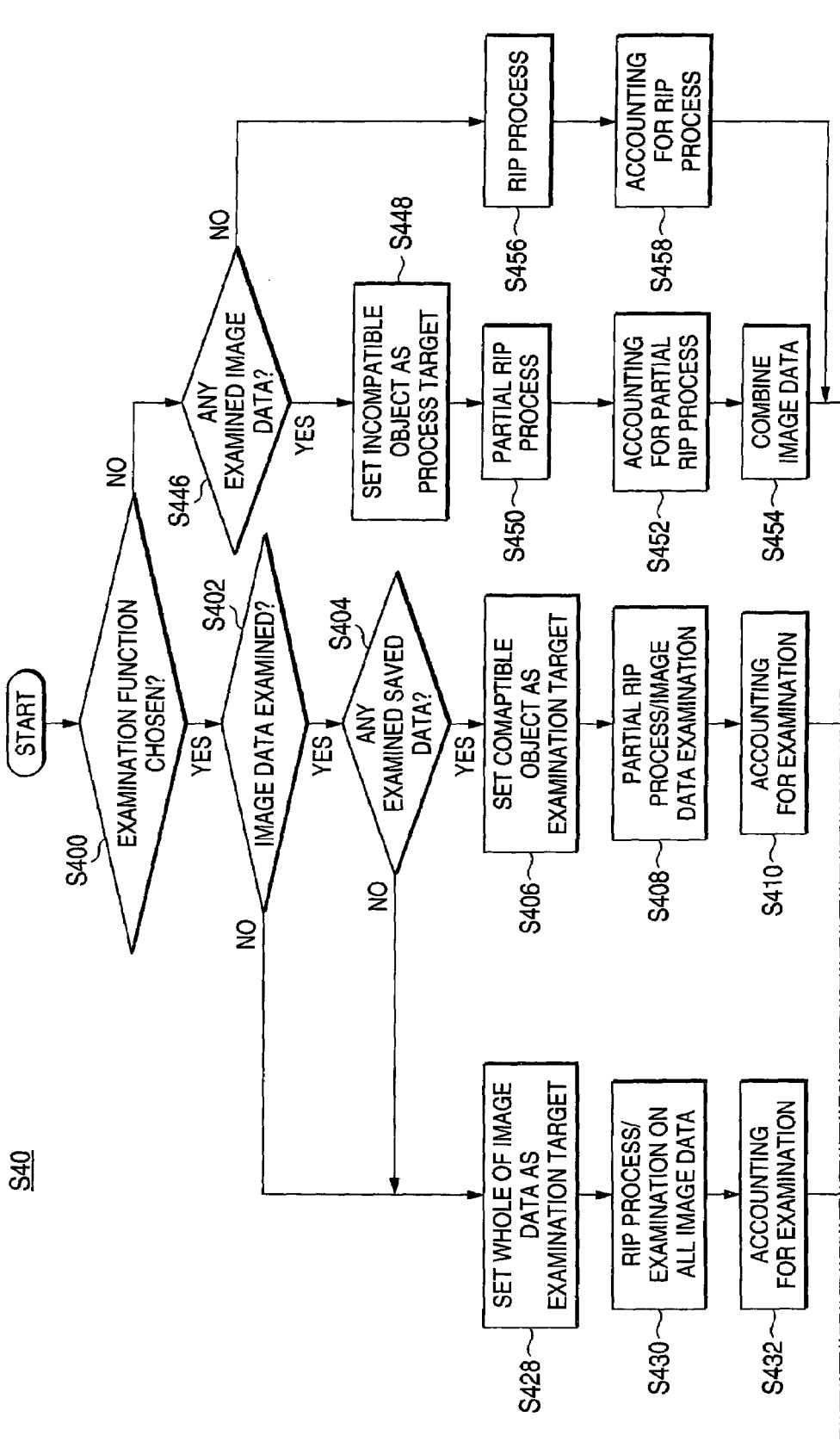
FIG. 29 is a flow chart showing a process (S40) of the third RIP/color correction program shown in FIG. 28.

FIG. 29 is a flow chart showing a process (S40) of the third RIP/color correction program 36 shown in FIG. 28.

The processing of the RIP/color correction program 36 will be described below along a specific example in which printing compatibility with the printing machine 142 is examined.

Figure 30:
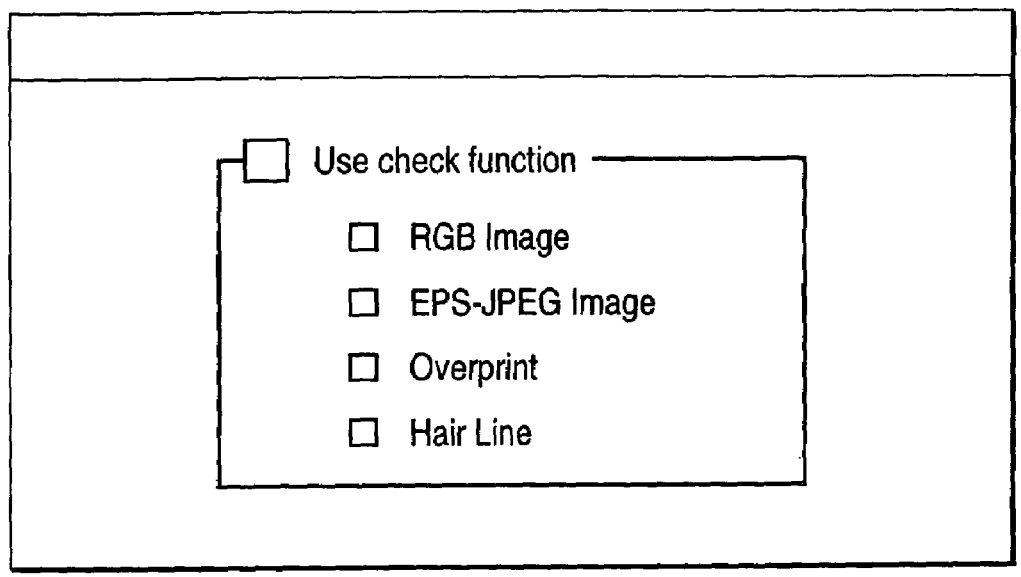
FIG. 30 is a view showing an examination function selecting image displayed by the RIP/color correction program shown in FIG. 29, by way of example.

FIG. 30 is a view showing an examination function selecting image displayed by the RIP/color correction program 36 shown in FIG. 29, by way of example.

Figure 31:
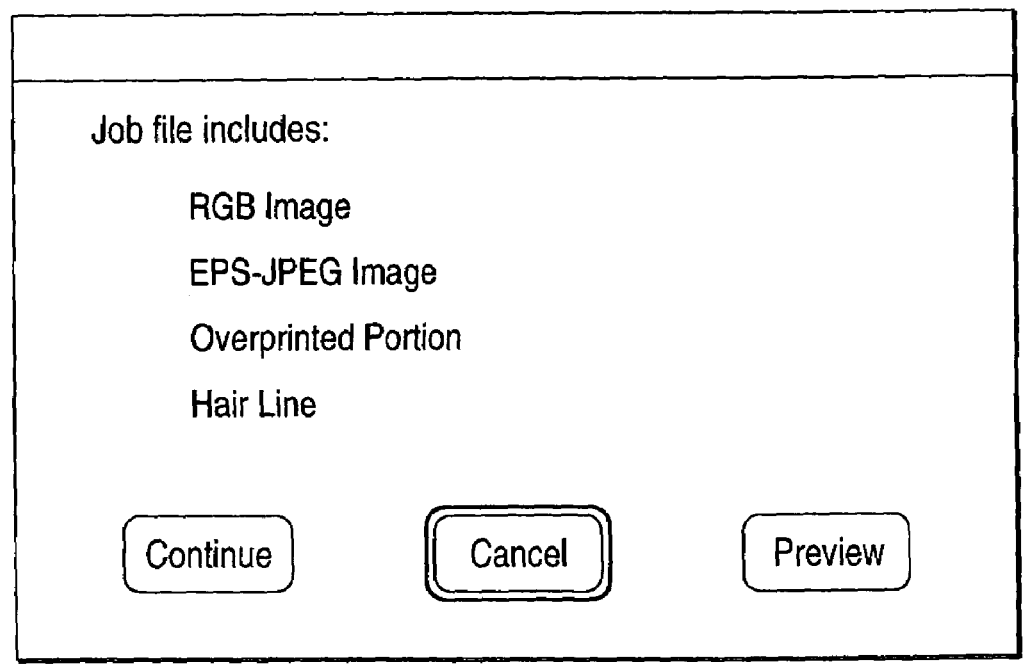
FIG. 31 is a view showing an examination result display image displayed when the RIP/color correction program shown in FIG. 29 has detected a printing incompatible portion from drawing data, by way of example.

FIG. 31 is a view showing an examination result display image displayed when the RIP/color correction program 36 shown in FIG. 29 has detected a printing incompatible portion from drawing data, by way of example.

Roughly speaking, the processing shown in FIG. 29 can be considered in the four processes including a first process of S456-S458, a second process of S446-S454, a third process of S402-S424 and a fourth process of S428-S444.

Of the four processes, the first process corresponds to a normal RIP process using no examination function.

The second process corresponds to a process when RIP-processed data including an incompatible object and data indicating the details of the result of the process have been saved by the examination function executed in a previous process.

The third process corresponds to a process when RIP-processed data including an incompatible object and data indicating the details of the result of the process have been saved by the examination function executed in this process.

There is a possibility that such a process is repeated by a user several times.

In the third process, any object judged to be incompatible in a previous process is excluded, and a partial RIP process in this time is executed. As a result, a new incompatible object is detected. In such an event, with the new incompatible object, processed data obtained by the previous process correspondingly to the new incompatible object is combined and saved again.

The fourth process corresponds to a process when the examination function is selected and executed for the first time in this process, or when the result of a previous process has not been saved in spite of the examination function executed in the previous process (incidentally, the processing of S400 which will be described later corresponds to a judgment as to whether the examination function has been executed before or not, and the processing of S402 corresponds to a judgment as to whether saved data is present or not).

In the fourth process, both the examination function and the RIP process are executed, and accounting is done for the both.

A combining process is executed upon RIP-processed pieces of image data in the following description.

As shown in FIG. 29, in Step 400 (S400), the UI portion 308 displays, for example, an examination function selecting image shown in FIG. 30, on the input/display unit 106 (FIG. 2) of the client PC 20 (FIG. 14).

The user of the client PC 20 operates on the image displayed on the input/display unit 106 so as to check a button corresponding to the portion "use check function (examination function)". Thus, the user chooses whether the examination function is applied to image data (drawing data) or not.

In addition, the user of the client PC 20 further checks buttons corresponding to items (RGB image, EPS-JPEG image, overprint, hair line) to be examined. Thus, the user selects examination items.

The RIP/color correction program 36 advances to the processing of S402 when the user chooses the execution of the examination function. Otherwise the RIP/color correction program 36 jumps to the processing of S446.

In Step 402 (S402), the drawing data examination portion 360 retrieves the image data DB 350, and judges whether a job (image data) to be examined currently in the processing of S402 has been examined and saved before.

The RIP/color correction program 36 advances to the processing of S404 when examined and processed data is present. Otherwise the RIP/color correction program 36 jumps to the processing of S428.

The judgment in the processing of S402 is based on whether RIP-processed data (rasterized bitmap data) stored in the image data DB 350, and data indicating the details of the process result accompanied by the RIP-processed data (including information as to where the data in question is present in a job file) are present or not.

In the event of an affirmative judgment in the processing of S400, that is, when the examination function is chosen, the processing of S402 judges whether the job to be subjected to this processing has been examined before and the result thereof has been saved or not.

When the RIP-processed data and the data accompanied by the RIP-processed data are present in the image data DB 350, an affirmative judgment is made in S404 and the processing of S406 is executed.

Further, in the processing of S408, examination is executed upon any object than the incompatible objects detected in the previous examination.

In Step 404 (S404), the drawing data examination portion 360 judges whether examined image data (drawing data; RIP-processed data) has been stored in the image data DB 350 or not.

The RIP/color correction program 36 advances to the processing of S406 when the examined image data (drawing data) has been stored. Otherwise the RIP/color correction program 36 jumps to the processing of S428.

In Step 406 (S406), for example, the drawing data examination portion 360 selects objects (compatible objects) judged to be compatible with printing done with the printing machine 142 in the previous examination, as a target of examination, from image constituent portions (hereinafter also referred to simply as "objects") such as image objects and document objects constituting the examined image data (drawing data).

In Step 408. (S408), the drawing data examination portion 360 judges whether RGB images and the like set as a target of examination in the processing of S400 and incompatible with a print process using the printing machine 142 are included or not in the compatible objects set as a target of examination in the processing of S406.

The examination process should be executed integrally with a partial RIP process. The partial RIP process is executed in S408.

The reprocessing control portion 316 controls the constituent parts of the RIP/color correction program 36 so as to perform a RIP process (partial RIP process) upon the printing compatible objects set as a target of examination in the processing of S406.

The reprocessing control portion 316 stores the result of the partial RIP process into the process history DB 314 as a process log.

The partial RIP process can be attained by applying a suitable change to a re-RIP process, for example, setting a printing incompatible portion or a printing compatible portion as a target of the process.

In Step 410 (S410), the drawing data examination portion 360 stores necessary data such as the examination result into the process history DB 314 as a process log.

The accounting information creation portion 318 creates accounting information about the examination process based on the process log and an accounting table stored in the accounting information DB 320, and supplies the created accounting information to the accounting server 4.

The accounting server 4 performs an accounting process upon the client PC 20 based on the accounting information.

In Step 412 (S412), the drawing data examination portion 360 judges whether an incompatible object has been detected or not.

When no incompatible object has been detected, the UI portion 308 displays that fact on the input/display unit 106 (FIG. 2) of the client PC 20, and terminates the process. Otherwise the UI portion 308 advances to the processing of S414.

In Step 414 (S414), the UI portion 308 displays an image indicating the examination result on the input/display unit 106 (FIG. 2) of the client PC 20 as shown in FIG. 31 by way of example, showing the user of the client PC 20 the incompatible objects detected as a result of the examination.

In Step 416 (S416), the UI portion 308 judges whether the user of the client PC 20 has operated to give an instruction to continue the process or not.

The RIP/color correction program 36 advances to the processing of S418 when the instruction to continue the process has been given. Otherwise the RIP/color correction program 36 jumps to the processing of S426.

An instruction as to whether to continue the process by the client PC 20 is made by choosing a button "continue" or "cancel" shown in the lower portion of FIG. 31. When the button "continue" is chosen, the process is continued. When the button "cancel" is chosen, the process is aborted.

In Steps 418 and 420 (S418 and S420), the reprocessing control portion 316 controls the combination processing portion 340 to combine the printing compatible objects (RIP-processed) set as a target of examination in the processing of S406 with the printing incompatible objects corresponding thereto, and saves the combined image data into the image data DB 350

In Step 424 (S424), the accounting information creation portion 318 creates accounting information for the partial RIP process based on the process log and the accounting table stored in the accounting information DB 320, and supplies the created accounting information to the accounting server 4.

The accounting server 4 performs an accounting process upon the client PC 20 based on the accounting information.

In Step 426 (S426), the RIP/color correction program 36 performs a process required for aborting the subsequent processing to be performed on the image data (drawing data) In Step 428 (S428), the drawing data examination portion 360 sets the whole of the image data (drawing data) as a target of an examination process.

In Step 430 (S430), the drawing data examination portion 360 performs an examination process on all the image data, and stores a process log of the examination result into the process history DB 314.

As described previously, the examination process and the RIP process are executed integrally. Also in the processing of S428, the reprocessing control portion 316 controls the constituent parts of the RIP/color correction program 36 so as to execute a RIP process on all the image data (drawing data).

The reprocessing control portion 316 stores the result of the RIP process into the process history DB 314 as a process log.

In Step 432 (S432), the accounting information creation portion 318 creates accounting information for the examination process based on the process log and the accounting table stored in the accounting information DB 320, and supplies the created accounting information to the accounting server 4.

The accounting server 4 performs an accounting process upon the client PC 20 based on the accounting information.

In Step 434 (S434), the drawing data examination portion 360 judges whether a printing incompatible object has been detected or not.

The RIP/color correction program 36 advances to the processing of S436 when a printing incompatible object has been detected. Otherwise the RIP/color correction program 36 displays that fact on the input/display unit 106 of the client PC 20, and terminates the process.

In Step 436 (S436), the UI portion 308 displays an image shown in FIG. 31, showing the detected incompatible object to the user of the client PC 20.

In Step 438 (S438), the UI portion 308 judges whether an instruction to continue the process has been given from the user of the client PC 20 or not, in the same manner as in the processing of S416.

The RIP/color correction program 36 advances to the processing of S440 when the instruction to continue the process has been given. Otherwise the RIP/color correction program 36 jumps to the processing of S426.

In Step 440 (S440), the drawing data examination portion 360 stores the examined image data (RIP-processed) into the image data DB 350.

In Step 444 (S444), the accounting information creation portion 318 creates accounting information for the RIP process based on the process log and the accounting table stored in the accounting information DB 320, and supplies the created accounting information to the accounting server 4.

The accounting server 4 performs an accounting process upon the client PC 20 based on the accounting information.

In Step 446 (S446), the drawing data examination portion 360 judges whether the examined image data has been stored in the image data DB 350 or not.

The RIP/color correction program 36 advances to the processing of S448 when the examined image data (RIP-processed) has been stored in the image data DB 350. Otherwise the RIP/color correction program 36 jumps to the processing of S456.

In Step 448 (S448), the drawing data examination portion 360 selects a printing incompatible object as a target of a partial RIP process.

In Step 450 (S450), the reprocessing control portion 316 controls the constituent parts of the RIP/color correction program 36 so as to perform a partial RIP process upon the printing incompatible object set as a target of the RIP process in the processing of S448.

In Step 452 (S452), the reprocessing control portion 316 controls the constituent parts of the RIP/color correction program 36 so as to store the result of the partial RIP process into the process history DB 314 as a process log.

In Step 452 (S452), the accounting information creation portion 318 creates accounting information for the partial RIP process based on the process log and the accounting table stored in the accounting information DB 320, and supplies the created accounting information to the accounting server 4.

The accounting server 4 performs an accounting process upon the client PC 20 based on the accounting information.

In Step 454 (S454), the reprocessing control portion 316 controls the combination processing portion 340 so as to combine the image data obtained as a result of the partial RIP process upon the printing incompatible objects with the image data obtained as a result of the RIP process upon the printing compatible objects, and stores the combined image data into the image data DB 350.

In Step 456 (S456), the RIP processing portion 310 performs a RIP process on all the image data (drawing data), and stores the result of the RIP process into the process history DB 314 as a process log.

In Step 458 (S458), the accounting information creation portion 318 creates accounting information for the RIP process based on the process log and the accounting table stored in the accounting information DB 320, and supplies the created accounting information to the accounting server 4.

The accounting server 4 performs an accounting process upon the client PC 20 based on the accounting information.

As described above, in image processing apparatus and an image processing method according to the invention, it is possible to provide a processing function to a user, and do accounting for each process and each piece of data required for the process flexibly in accordance with the mode of the process.

What is claimed is:

1. An image processing apparatus comprising:
an image processing unit that performs a first image processing on image data including one or more image constituent parts;
an incompatible part detection unit that executes an incompatibility detection processing to detect an incompatible part of the image data, the incompatible part being incompatible with the first image processing, the incompatibility detection processing being integrally executed with image processing;
an accounting unit that charges for the executed incompatibility detection processing; and
a detection result storing unit that stores at least a result of the incompatibility detection processing in a separate location from the image data, wherein
if a result of the incompatibility detection processing executed on given image data has been stored when the incompatible part detection unit is to execute the incompatibility detection processing on the given image data, the incompatible part detection unit executes the incompatibility detection processing only an already-detected incompatible part of the given image data; and
if no result of the incompatibility detection processing executed on the given image data is stored when the incompatible part detection unit is to execute the incompatibility detection processing on the given image data, the incompatible part detection unit performs the incompatibility detection processing on the entire given image data.

2. An image processing method comprising:
performing a first image processing on image data including one or more image constituent parts;
executing an incompatibility detection processing to detect an incompatible part of the image data, the incompatible part being incompatible with the first image processing, the incompatibility detection processing being integrally executed with image processing;
charging for the executed incompatibility detection processing; storing at least a result of the incompatibility detection processing in a separate location from the image data;
if a result of the incompatibility detection processing executed on given image data has been stored when the executing of the incompatibility detection processing is to execute the incompatibility detection processing on the given image data, executing the incompatibility detection processing only on an already-detected incompatible part of the given image data; and
if no result of the incompatibility detection processing executed on the given image data is stored when the executing of the incompatibility detection processing is to execute the incompatibility detection processing on the given image data, performing the incompatibility detection processing on the entire given image data, wherein the above steps are performed by a processor device.

3. A computer-readable medium storing a program for causing a computer to execute image processing, the image processing comprising:
performing a first image processing on image data including one or more image constituent parts;
executing an incompatibility detection processing to detect an incompatible part of the image data, the incompatible part being incompatible with the first image processing, the incompatibility detection processing being integrally executed with image processing;
charging for the executed incompatibility detection processing;
storing at least a result of the incompatibility detection processing in a separate location from the image data;
if a result of the incompatibility detection processing executed on given image data has been stored when the executing of the incompatibility detection processing is to execute the incompatibility detection processing on the given image data, executing the incompatibility detection processing only on an already-detected incompatible part of the given image data; and
if no result of the incompatibility detection processing executed on the given image data is stored when the executing of the incompatibility detection processing is to execute the incompatibility detection processing on the given image data, performing the incompatibility detection processing on the entire given image data.

4. The image processing apparatus according to claim 1, wherein
the first image processing is a print job for printing the image data;

the incompatible part detection unit detects, as the incompatible part, an image constituent part on which the print job cannot be performed normally, from the image constituent parts of the image data;

the image processing unit further performs a second image processing;

when an instruction to execute the second image processing on the image constituent parts on which the incompatibility detection processing has been performed is given in response to the displaying of the incompatible part, the second image processing is executed on the incompatible part;

the incompatible part subjected to the second image processing is combined with image constituent parts other than the incompatible part subjected to the second image processing; and the accounting unit further charges for a part of the print job for the executed second image processing, and does not charge for the entire print job.

5. The image processing method according to claim 2, wherein the first image processing is a print job for printing the image data;

the executing of the incompatibility detection processing detects, as the incompatible part, an image constituent part on which the print job cannot be performed normally, from the image constituent parts of the image data;

the performing of the first image processing further performs a second image processing;

when an instruction to execute the second image processing on the image constituent parts on which the incompatibility detection processing has been performed is given in response to a displaying of the incompatible part, the second image processing is executed on the incompatible part;

the incompatible part subjected to the second image processing is combined with image constituent parts other than the incompatible part subjected to the second image processing; and the charging further charges for a part of the print job for the executed second image processing, and does not charge for the entire print job.

6. The computer readable medium according to claim 3, wherein the first image processing is a print job for printing the image data;

the executing of the incompatibility detection processing detects, as the incompatible part, an image constituent part on which the print job cannot be performed normally, from the image constituent parts of the image data;

the performing of the first image processing further performs a second image processing;

when an instruction to execute the second image processing on the image constituent parts on which the incompatibility detection processing has been performed is given in response to a displaying of the incompatible part, the second image processing is executed on the incompatible part;

the incompatible part subjected to the second image processing is combined with image constituent parts other than the incompatible part subjected to the second image processing; and the charging further charges for a part of the print job for the executed second image processing, and does not charge for the entire print job.

* * * * *